United States Patent
Hotta et al.

(10) Patent No.: US 10,794,314 B2
(45) Date of Patent: *Oct. 6, 2020

(54) UNEQUAL INTERVAL COMBUSTION ENGINE MISFIRE DETERMINATION DEVICE AND VEHICLE

(71) Applicants: DENSO CORPORATION, Kariya-shi, Aichi (JP); YAMAHA HATSUDOKI KABUSHIKI KAISHA, Iwata-shi, Shizuoka (JP)

(72) Inventors: Minoru Hotta, Kariya (JP); Yoshihiko Nonogaki, Kariya (JP); Hisatoshi Kinoshita, Iwata (JP); Yo Aramaki, Iwata (JP); Kazuteru Iwamoto, Iwata (JP)

(73) Assignees: DENSO CORPORATION, Kariya-Shi, Aichi (JP); YAMAHA HATSUDOKI KABUSHIKI KAISHA, Iwata-Shi, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/178,520

(22) Filed: Nov. 1, 2018

(65) Prior Publication Data
US 2019/0128199 A1 May 2, 2019

(30) Foreign Application Priority Data
Nov. 2, 2017 (JP) ................... 2017-212400

(51) Int. Cl.
*F02D 41/14* (2006.01)
*F02D 41/00* (2006.01)
(Continued)

(52) U.S. Cl.
CPC ..... *F02D 41/1497* (2013.01); *F02D 41/0097* (2013.01); *F02D 41/1498* (2013.01);
(Continued)

(58) Field of Classification Search
CPC ............ F02D 41/1497; F02D 41/1498; F02D 41/0097; F02D 2041/1432;
(Continued)

(56) References Cited

U.S. PATENT DOCUMENTS

| 7,536,902 B2* | 5/2009 | Tsukamoto | G01M 15/11 73/114.04 |
| 8,909,403 B2* | 12/2014 | Yokouchi | B60K 6/445 701/22 |

(Continued)

FOREIGN PATENT DOCUMENTS

| EP | 3306064 A1 | 4/2018 |
| JP | H10148153 A | 6/1998 |

(Continued)

*Primary Examiner* — Freddie Kirkland, III
(74) *Attorney, Agent, or Firm* — Rabin & Berdo, P.C.

(57) ABSTRACT

An unequal-interval combustion engine misfire-determination device determines whether a misfire has occurred in an unequal-interval combustion engine including a plurality of cylinders in which combustion occurs at unequal intervals. The misfire determination device includes: an unequal interval combustion fluctuation canceled value acquisition unit that acquires, based on a crank angle signal, an unequal interval combustion fluctuation canceled value which is a rotation speed in a section of 720×m crank angle degrees including a predetermined determination angle position, where m is a natural number; an unequal interval combustion fluctuation manifested value calculation unit that calculates an unequal interval combustion fluctuation manifested value in which a fluctuation component attributable to unequal interval combustion is manifested, by removing the unequal interval combustion fluctuation canceled value; and a specific cylinder misfire determination unit that determines a misfire in a specific cylinder based on the unequal interval combustion fluctuation manifested value.

10 Claims, 11 Drawing Sheets

(51) Int. Cl.
  *F02P 17/12*  (2006.01)
  *G01M 15/11*  (2006.01)
(52) U.S. Cl.
  CPC ............. *F02P 17/12* (2013.01); *G01M 15/11* (2013.01); *F02D 2041/1432* (2013.01); *F02D 2200/101* (2013.01); *F02D 2200/1002* (2013.01); *F02D 2200/1015* (2013.01); *F02D 2250/14* (2013.01); *F02P 2017/128* (2013.01)
(58) Field of Classification Search
  CPC ....... F02D 2200/101; F02D 2200/1015; F02D 2250/14; F02D 2200/1002; F02P 17/12; F02P 2017/128; G01M 15/11
  See application file for complete search history.

(56) References Cited

U.S. PATENT DOCUMENTS

| | | | |
|---|---|---|---|
| 9,857,273 B2* | 1/2018 | Hozumi | ............... G01M 15/11 |
| 10,378,468 B2* | 8/2019 | Minatoya | ............ F02D 41/1498 |
| 10,408,151 B2* | 9/2019 | Hotta | ..................... F02D 45/00 |
| 2007/0157713 A1* | 7/2007 | Tsukamoto | ............ G01M 15/11 |
| | | | 73/114.04 |
| 2012/0232774 A1 | 9/2012 | Minatoya et al. | |
| 2013/0190962 A1 | 7/2013 | Yokouchi et al. | |
| 2018/0087462 A1* | 3/2018 | Hotta | .................. F02D 41/1498 |

FOREIGN PATENT DOCUMENTS

| | | |
|---|---|---|
| JP | 2016-070255 A | 5/2016 |
| WO | WO 2016-194953 A1 | 12/2016 |
| WO | WO 2018-179341 A1 | 10/2018 |

\* cited by examiner

UNEQUAL INTERVAL COMBUSTION ENGINE MISFIRE DETERMINATION DEVICE AND VEHICLE

TECHNICAL FIELD

The present teaching relates to an unequal interval combustion engine misfire determination device, and to a vehicle including the misfire determination device.

BACKGROUND ART

Patent Literature 1 (PTL 1) shows a misfire determination device. The misfire determination device of PTL 1 determines a misfire in an unequal interval explosion engine. The misfire determination device of PTL 1 computes a generated torque correlation amount at a crank angle position not corresponding to an ignition timing. The misfire determination device of PTL 1 further computes an average value based on the generated torque correlation amount thus computed. The misfire determination device of PTL 1 further performs a misfire determination based on the average value of the generated torque correlation amount thus computed. The generated torque correlation amount is, for example, a rotation speed. The misfire determination device of PTL 1 computes an average value of the generated torque correlation amount in a section shorter than one cycle, that is, in a section shorter than 720 crank angle degrees, and compares the computed average value against a threshold, for a misfire determination. Thus, a change in the generated torque correlation amount within one cycle of an unequal interval combustion engine is reflected in the average value.

PTL 1 also discloses a misfire determination device that performs a misfire determination by calculating a difference between a rotation speed at a time of determination and a section rotation speed at a time of non-misfire which is before the determination.

CITATION LIST

Patent Literature

PTL 1: Japanese Patent Application Laid-Open No. 2016-070255

SUMMARY OF INVENTION

Technical Problem

Studies on a determination process in the unequal interval combustion engine misfire determination device as shown in PTL 1 revealed that a determination is sometimes difficult depending on forms of the misfire.

An object of the present teaching is to provide an unequal interval combustion engine misfire determination device and a vehicle that are applicable to various forms of misfires.

Solution to Problem

The present inventors studied various forms of misfires in an unequal interval combustion engine, to discover that the determination accuracy is sometimes low in a case of continuous misfires.

The present inventors conducted detailed studies on continuous misfires in an unequal interval combustion engine.

The rotation speed of the unequal interval combustion engine has a fluctuation attributable to combustion of the unequal interval combustion engine and a fluctuation attributable to factors other than combustion.

Examples of the rotation speed fluctuation attributable to combustion of the unequal interval combustion engine include an increase at a time of combustion and a decrease after combustion. Due to the increase, a peak of the rotation speed arises. For example, in a case of a single-cylinder engine, a peak comes every 720 crank angle degrees, and thus the crank angle between successive peaks is substantially constant. For example, in a case of an engine including a plurality of cylinders in which combustion occurs at equal intervals, the combustion in each of the cylinders repeatedly occurs at equal intervals, and therefore the crank angle between peaks is substantially constant.

Examples of the fluctuation attributable to factors other than repeated combustion include a fluctuation according to a fluctuation in intake air amount which is caused by a driver's operating an accelerator. The fluctuation in the rotation speed attributable to factors other than combustion also includes a fluctuation attributable to a load applied from a wheel and a chain to the engine, for example.

To determine various forms of misfires with a high accuracy, it is conceivable to perform the determination by using a fluctuation from which the fluctuation attributable to factors other than combustion has been excluded.

In the unequal interval combustion engine, the interval between a crank angle where one cylinder causes combustion and a crank angle where another cylinder next to the one cylinder causes combustion varies depending on cylinders. A rotation speed at a time of combustion in one cylinder is influenced by energy generated by combustion in another cylinder previous to the combustion in the one cylinder, the energy decreasing over time. The rotation speed at a time of combustion, therefore, varies from cylinder to cylinder, for example. Thus, in the unequal interval combustion engine, both the crank angle between peaks and the peak value vary from cylinder to cylinder. It is difficult to exclude a fluctuation attributable to factors other than combustion from the rotation speed which fluctuates with both the crank angle between peaks and the peak value varying from cylinder to cylinder, for determining a misfire with a high accuracy. This is one of the reasons why determining various forms of misfires in the unequal interval combustion engine is difficult. Thus, it may be difficult to obtain a high-accuracy determination of continuous misfires in the unequal interval combustion simply by, for example, applying a process of calculating a rotation fluctuation at every fixed crank angle to the unequal interval combustion engine and adjusting a crank angle that serves as a calculation condition. An approach of comparing an average value in a section shorter than one cycle against a threshold as disclosed in PTL 1 may also have a difficulty in reducing an influence of a fluctuation attributable to unequal interval combustion to determine continuous misfires with a high accuracy. An approach of performing a determination by calculating a difference between a rotation speed at a time of determination and a section rotation speed at a time before the determination as disclosed in PTL 1 can detect a single misfire, but faces a difficulty in detecting continuous misfires.

The present inventors conceived an idea of firstly acquiring a value in which a fluctuation component attributable to unequal interval combustion is canceled, instead of acquiring the fluctuation component attributable to unequal interval combustion in an unequal interval combustion engine. The present inventors conceived of acquiring a rotation speed in a section of 720×m crank angle degrees as the value in which the fluctuation component attributable to unequal interval combustion is canceled. Here, m is a natural number. Any of a plurality of cylinders included in the unequal interval combustion engine completes its one-cycle operation in 720 crank angle degrees. In the rotation speed in a section of 720×m crank angle degrees, therefore, the fluctuation component attributable to unequal interval combustion is canceled.

The present inventors discovered that removing the value in which the fluctuation component attributable to unequal interval combustion is canceled from the rotation speed enables the fluctuation component attributable to unequal interval combustion to be manifested with a high accuracy. To be more specific, removing a rotation speed in a section of 720×m crank angle degrees including a determination angle position from a rotation speed obtained at this determination angle position enables the fluctuation component attributable to unequal interval combustion to be manifested with a high accuracy. As a result of testing this control on a single misfire, it was found that a single misfire can also be detected.

The present teaching was made based on the above findings. An unequal interval combustion engine misfire determination device according to the present teaching is applicable to various forms of misfires.

An unequal interval combustion engine misfire determination device according to each aspect of the present teaching accomplished based on the above findings has the following configurations.

(1) In an aspect of the present teaching, an unequal interval combustion engine misfire determination device is an unequal interval combustion engine misfire determination device that determines a misfire in an unequal interval combustion engine including a plurality of cylinders in which combustion occurs at unequal intervals and a crankshaft, the determination being performed based on a crank angle signal indicating a rotation angle of the crankshaft, the unequal interval combustion engine misfire determination device including:

an unequal interval combustion fluctuation canceled value acquisition unit that acquires an unequal interval combustion fluctuation canceled value for every 720 crank angle degrees based on the crank angle signal while the unequal interval combustion engine is in operation, the unequal interval combustion fluctuation canceled value being a value in which a fluctuation component attributable to unequal interval combustion is canceled, the unequal interval combustion fluctuation canceled value being a rotation speed in a section of 720×m crank angle degrees including a predetermined determination angle position, where m is a natural number;

an unequal interval combustion fluctuation manifested value calculation unit that calculates an unequal interval combustion fluctuation manifested value based on the crank angle signal while the unequal interval combustion engine is in operation, the unequal interval combustion fluctuation manifested value being a value in which the fluctuation component attributable to unequal interval combustion is manifested, the calculation being performed by removing, from a rotation speed at the determination angle position, the unequal interval combustion fluctuation canceled value acquired by the unequal interval combustion fluctuation canceled value acquisition unit, the unequal interval combustion fluctuation canceled value being a rotation speed in a section of 720×m crank angle degrees including the determination angle position; and a specific cylinder misfire determination unit that determines a misfire in a specific cylinder among the plurality of cylinders included in the unequal interval combustion engine, based on the unequal interval combustion fluctuation manifested value calculated by the unequal interval combustion fluctuation manifested value calculation unit while the unequal interval combustion engine is in operation.

In the unequal interval combustion engine misfire determination device according to (1), the unequal interval combustion fluctuation canceled value which is a rotation speed in a section of 720×m crank angle degrees including the determination angle position is removed from a rotation speed that is based on the crank angle signal. By removing the unequal interval combustion fluctuation canceled value from the rotation speed at the determination angle position, the unequal interval combustion fluctuation manifested value is calculated.

The section of 720×m crank angle degrees, for which the unequal interval combustion fluctuation canceled value is acquired, includes the determination angle position. This allows a state of the section including the determination angle position to be reflected in the unequal interval combustion fluctuation canceled value. Accordingly, a combustion state in the section including the determination angle position is reflected in the unequal interval combustion fluctuation manifested value with a high accuracy. In a case of a misfire occurring, therefore, the unequal interval combustion fluctuation manifested value varies more prominently as compared with when, for example, a section for which a rotation speed is acquired is a section that is before the determination angle position and that includes no determination angle position. Thus, in the unequal interval combustion fluctuation manifested value, a fluctuation attributable to unequal interval combustion and a fluctuation attributable to a misfire of unequal interval combustion are manifested with a higher accuracy.

Accordingly, a misfire in a specific cylinder of the unequal interval combustion engine can be determined with a high accuracy.

(2) Another aspect of the present teaching is the unequal interval combustion engine misfire determination device according to (1), in which the unequal interval combustion fluctuation canceled value acquisition unit acquires, for every 720 crank angle degrees, a rotation speed in a section of 720×m crank angle degrees centered at the determination angle position, as the unequal interval combustion fluctuation canceled value, the unequal interval combustion fluctuation manifested value calculation unit calculates an unequal interval combustion fluctuation manifested value in which the fluctuation component attributable to unequal interval combustion is manifested, by removing, from a rotation speed at least at the determination angle position, a value of the rotation speed in a section of 720×m crank angle degrees centered at the determination angle position, the value serving as the unequal interval combustion fluctuation canceled value acquired by the unequal interval combustion fluctuation canceled value acquisition unit, and the specific cylinder misfire determination unit determines a misfire in a specific cylinder among the plurality of cylinders included in the unequal interval combustion engine, based on the unequal interval combustion fluctuation manifested value calculated by the unequal interval combustion fluctuation manifested value calculation unit.

In the unequal interval combustion engine misfire determination device according to (2), the rotation speed acquired as the unequal interval combustion fluctuation canceled value is a rotation speed in a section of 720×m crank angle degrees centered at the determination angle position. That is, the determination angle position is at the center of the section of 720×m crank angle degrees for which the unequal interval combustion fluctuation canceled value is acquired. This allows a combustion state at the determination angle position to be reflected in the unequal interval combustion fluctuation canceled value and the unequal interval combustion fluctuation manifested value with a higher accuracy.

Accordingly, a misfire in a specific cylinder of the unequal interval combustion engine can be determined with a higher accuracy.

(3) Another aspect of the present teaching is the unequal interval combustion engine misfire determination device according to (2), in which the specific cylinder misfire determination unit determines a misfire in a specific cylinder of the unequal interval combustion engine based on comparison of the unequal interval combustion fluctuation manifested value calculated by the unequal interval combustion fluctuation manifested value calculation unit while the unequal interval combustion engine is in operation against a predetermined reference value.

In the unequal interval combustion engine misfire determination device according to (3), a misfire is determined based on comparison between the unequal interval combustion fluctuation manifested value calculated by the unequal interval combustion fluctuation manifested value calculation unit and the reference value. Accordingly, a misfire in a specific cylinder of the unequal interval combustion engine can be easily determined with a high accuracy.

(4) Another aspect of the present teaching is the unequal interval combustion engine misfire determination device according to (2), in which the unequal interval combustion fluctuation canceled value acquisition unit further acquires, as a reference fluctuation canceled value, a value of a rotation speed in a section of 720×m crank angle degrees centered at a reference angle position different from the determination angle position, the reference angle position being such a position that a value obtained by removing a rotation speed in a section of 720×m crank angle degrees centered at the reference angle position from a rotation speed at the reference angle position is opposite in plus/minus sign to the unequal interval combustion fluctuation manifested value obtained at the determination angle position in a case of a misfire occurring, the unequal interval combustion fluctuation manifested value calculation unit further calculates a reference fluctuation manifested value in which the fluctuation component attributable to unequal interval combustion is manifested, by removing the reference fluctuation canceled value from the rotation speed at the reference angle position, based on the crank angle signal, and the specific cylinder misfire determination unit determines a misfire in a specific cylinder of the unequal interval combustion engine based on a difference between the unequal interval combustion fluctuation manifested value and the reference fluctuation manifested value.

In the unequal interval combustion engine misfire determination device according to (4), a misfire in a specific cylinder of the unequal interval combustion engine is determined based on a difference between two values obtained at the determination angle position and at the reference angle position, respectively. The two values are values obtained as a result of removal of the unequal interval combustion fluctuation canceled value and the reference fluctuation canceled value, respectively. In a case of a misfire occurring in a specific cylinder, a rotation speed in an angle position section corresponding to the misfiring cylinder is lower than a rotation speed value in a section of 720×m crank angle degrees centered at that position. Conversely, a rotation speed at a position in the remaining section is higher than a rotation speed value in a section of 720×m crank angle degrees centered at the position in the remaining section.

In the unequal interval combustion engine misfire determination device according to (4), in a case of a misfire occurring, the reference fluctuation manifested value obtained by removing a rotation speed value in a section of 720×m crank angle degrees centered at the reference angle position from a rotation speed at the reference angle position is opposite in plus/minus sign to the unequal interval combustion fluctuation manifested value obtained at the determination angle position. Thus, a difference between the unequal interval combustion fluctuation manifested value and the reference fluctuation manifested value is larger than the unequal interval combustion fluctuation manifested value. This provides further manifestation of a fluctuation caused by the misfire. Accordingly, a misfire in a specific cylinder of the unequal interval combustion engine can be determined with a higher accuracy.

(5) Another aspect of the present teaching is the unequal interval combustion engine misfire determination device according to (4), in which the specific cylinder misfire determination unit determines a misfire in a specific cylinder of the unequal interval combustion engine based on comparison of a difference between the unequal interval combustion fluctuation manifested value and the reference fluctuation manifested value against a predetermined reference value.

In the unequal interval combustion engine misfire determination device according to (5), a misfire is determined based on comparison of the difference between the unequal interval combustion fluctuation manifested value and the reference fluctuation manifested value against the reference value. Accordingly, a misfire in a specific cylinder of the unequal interval combustion engine can be easily determined with a higher accuracy.

(6) A vehicle according to another aspect of the present teaching includes:

the unequal interval combustion engine misfire determination device according to any one of (1) to (5); and an unequal interval combustion engine for which a misfire is determined by the unequal interval combustion engine misfire determination device.

In the configuration of (6), various forms of misfires in a specific cylinder of the unequal interval combustion engine can be determined with a high accuracy.

The terminology used herein is for defining particular embodiments only and is not intended to be limiting the teaching.

As used herein, the term "and/or" includes any and all combinations of one or more of the associated listed items.

As used herein, the terms "including", "comprising", or "having", and variations thereof specify the presence of stated features, steps, operations, elements, components, and/or equivalents thereof, and can include one or more of steps, operations, elements, components, and/or their groups.

As used herein, the terms "attached", "connected", "coupled", and/or equivalents thereof are used in a broad sense, and include both of direct and indirect attachment, connection, and coupling.

Unless otherwise defined, all terms (including technical and scientific terms) used herein have the same meaning as commonly understood by one of ordinary skill in the art to which the present teaching belongs.

It will be further understood that terms, such as those defined in commonly used dictionaries, should be interpreted as having a meaning that is consistent with their meaning in the context of the present disclosure and relevant art and should not be interpreted in an idealized or overly formal sense unless expressly so defined herein.

It will be understood that the description of the present teaching discloses a number of techniques and steps.

Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion.

Nevertheless, Description and Claims should be read with the understanding that such combinations are entirely within the scope of the present teaching and the claims. This Description describes a novel unequal interval combustion engine misfire determination device.

In the description given below, for the purposes of explanation, numerous specific details are set forth in order to provide a thorough understanding of the present teaching.

It will be apparent, however, that those skilled in the art may practice the present teaching without these specific details.

The present disclosure is to be considered as an exemplification of the present teaching, and is not intended to limit the present teaching to the specific embodiments illustrated by drawings or descriptions below.

The misfire as used herein means a phenomenon where combustion of a mixed gas in an engine is not normal. Normal combustion is caused when mixed gas supply, compression, and ignition spark are normally performed in a gasoline engine. Any abnormality in one or more of the mixed gas supply, compression, and ignition spark leads to a failure of normal combustion. More specifically, the misfire as used herein means a phenomenon where normal combustion of a mixed gas is not caused because of an abnormality in one or more of the mixed gas supply, compression, and ignition spark.

The continuous misfires in a specific cylinder mean a phenomenon where misfires continuously occur in one or more of a plurality of cylinders. That is, in a case of continuous misfires, a misfire occurs in continuous cycles.

The specific cylinder does not mean a cylinder that is specially selected in advance. The specific cylinder is an arbitrary cylinder. Continuous misfires in a specific cylinder mean a misfire continuously occurring in any arbitrary cylinder.

When, for example, a plurality of cylinders that are configured to undergo a combustion stroke one after another in one cycle have misfires occurring in all of the plurality of cylinders in a certain cycle, it can be said that misfires continuously occur in the certain cycle. If, however, both a cycle previous to the certain cycle and a cycle subsequent to the certain cycle have no misfire, such a situation is not considered as continuous misfires. This is because the misfire is not continuously occurring in each cylinder.

The unequal interval combustion engine misfire determination device according to the present teaching can be used for determination of continuous misfires. The unequal interval combustion engine misfire determination device according to the present teaching can be used for determination of a misfire other than continuous misfires. The unequal interval combustion engine misfire determination device according to the present teaching may be used for, for example, determination of a single misfire occurring in successive combustions.

Cancellation of a fluctuation component attributable to unequal interval combustion includes both zeroing the fluctuation component attributable to unequal interval combustion and reducing the fluctuation component attributable to unequal interval combustion as compared with an instantaneous rotation speed based on a crank angle signal.

The unequal interval combustion engine misfire determination device according to the present teaching determines a misfire based on a rotation speed. How to express the rotation speed in the device is not particularly limited. For example, the rotation speed may be expressed as a time required for the crankshaft to rotate through a predefined angle, or may be expressed as a rotational frequency or angle per unit time which is computed as a reciprocal for the time.

In the present teaching, the natural number m which determines a range corresponding to the unequal interval combustion fluctuation canceled value is one, for example. The value of m, however, is not limited to this, and it may be two or three, for example.

The unequal interval combustion engine includes a plurality of cylinders. The unequal interval combustion engine is an engine in which each of the plurality of cylinders causes combustion at unequal intervals on the basis of a crank angle as a reference. The unequal interval combustion engine is, for example, a gasoline engine fueled by gasoline. The engine including a plurality of cylinders may be, for example, a two-cylinder engine, a three-cylinder engine, or an engine with four or more cylinders. The engine including a plurality of cylinders may be, for example, a parallel type engine or a V-type engine.

The vehicle includes, for example, wheels in addition to the unequal interval combustion engine. The wheels include a drive wheel that is rotated by receiving power outputted from the unequal interval combustion engine. The number of wheels is not particularly limited. No particular limitation is put on the vehicle, and examples thereof include a four-wheel automobile and a straddled vehicle. In an instance, the four-wheel automobile has a cabin. The straddled vehicle means a type of vehicle in which a driver strides a saddle when seated. Examples of the straddled vehicle include motorcycles, motor tricycles, and ATVs (All-Terrain Vehicles).

Advantageous Effects of Invention

The present teaching can achieve an unequal interval combustion engine misfire determination device applicable to various forms of misfires in an unequal interval combustion engine, and a vehicle including the unequal interval combustion engine misfire determination device.

DESCRIPTION OF EMBODIMENTS

Some embodiments of the present teaching will now be described with reference to the drawings.

First Embodiment

Figure 1:
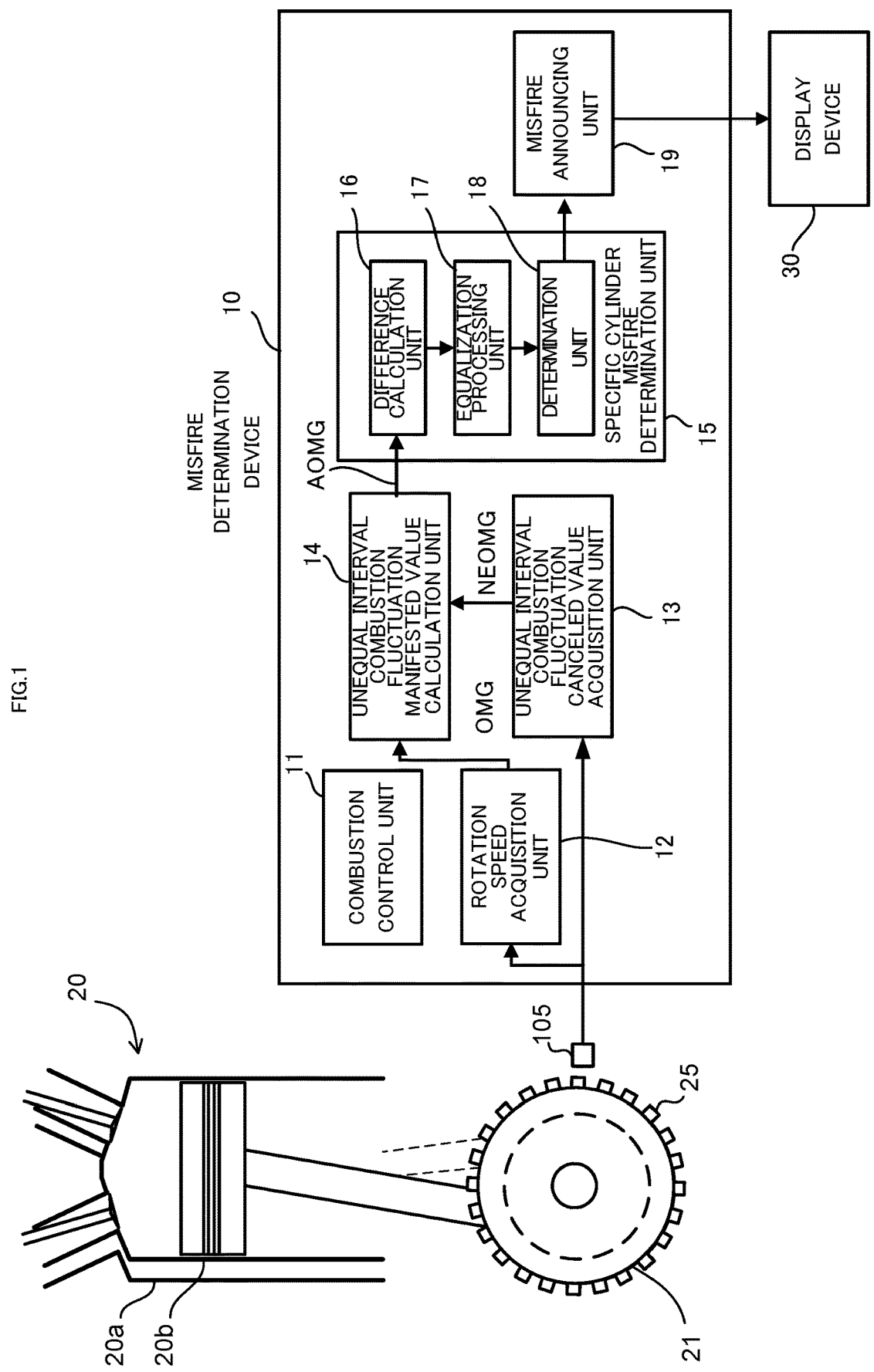
FIG. 1 is a diagram schematically showing a configuration of an unequal interval combustion engine misfire determination device and its peripheral devices according to a first embodiment of the present teaching.

FIG. 1 is a configuration diagram schematically showing configurations of an unequal interval combustion engine misfire determination device and its peripheral devices according to a first embodiment of the present teaching.

An unequal interval combustion engine misfire determination device 10 (which hereinafter may be simply referred to as misfire determination device 10) shown in FIG. 1 determines a misfire in an unequal interval combustion engine 20.

Figure 11:
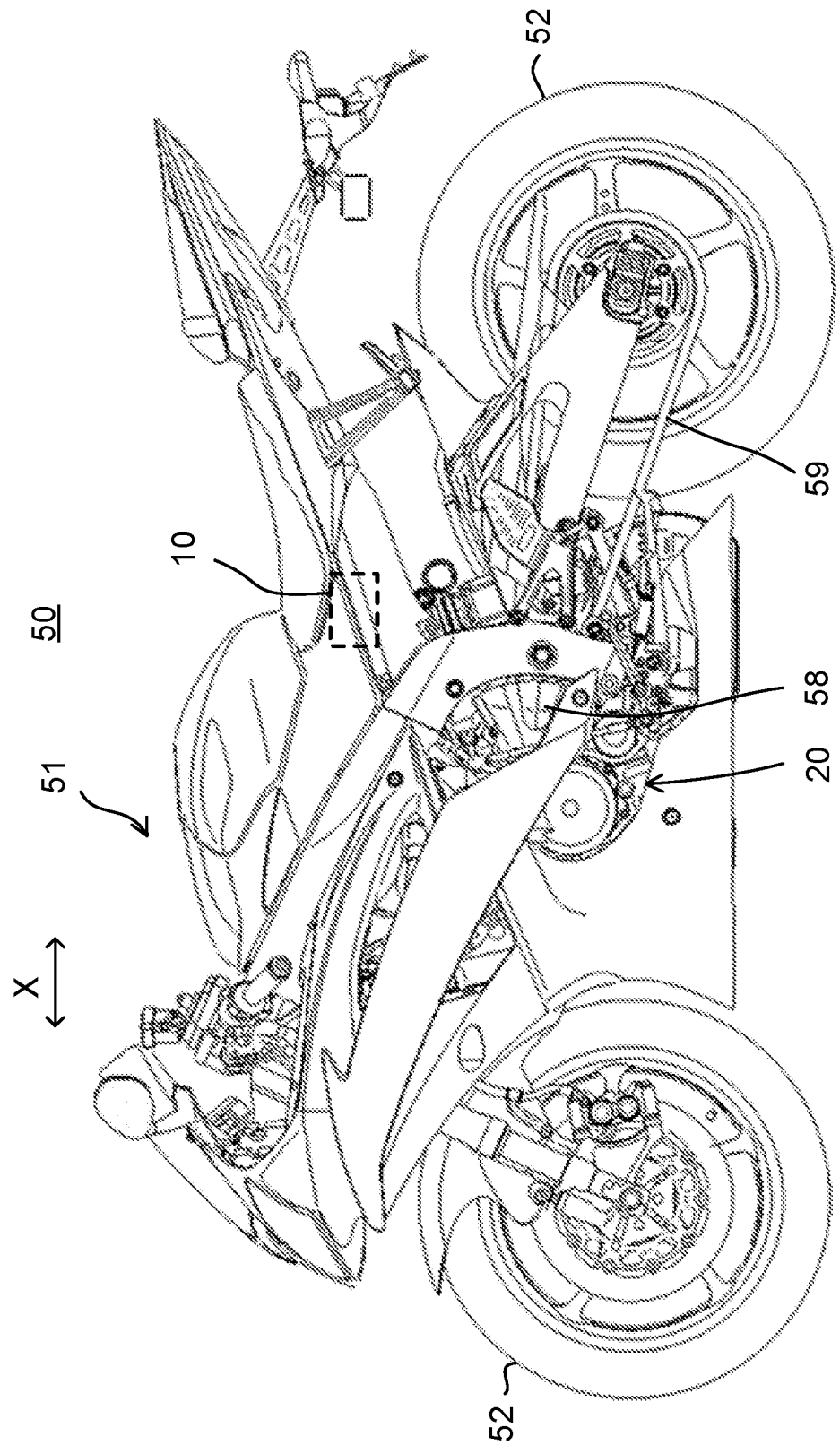
FIG. 11 is a diagram showing an external appearance of a straddled vehicle equipped with a misfire determination device according to any of the first to third embodiments.

The unequal interval combustion engine 20 may be provided in, for example, a straddled vehicle 50 shown in FIG. 11. The unequal interval combustion engine 20 drives the straddled vehicle 50, and more exactly drives a wheel 52 of the straddled vehicle 50.

The unequal interval combustion engine 20 of this embodiment is a four-stroke engine. The unequal interval combustion engine 20 includes a plurality of cylinders 20a, 20b. FIG. 1 shows two cylinders, and an internal configuration of one of the two cylinders is illustrated.

In the unequal interval combustion engine 20, combustion in each of the cylinders 20a, 20b is performed at unequal intervals on the basis of the rotation angle of the crankshaft.

The unequal interval combustion engine 20 includes a crankshaft 21. The crankshaft 21 is rotated along with an operation of the unequal interval combustion engine 20. That is, the crankshaft 21 is rotated by the unequal interval combustion engine 20. The crankshaft 21 is provided with a plurality of detection object parts 25 for detection of rotation of the crankshaft 21. The detection object parts 25 are arranged in a circumferential direction of the crankshaft 21 and spaced from one another by predefined arrangement angles when viewed from the rotation center of the crankshaft 21. The detection object parts 25 move as the crankshaft 21 rotates.

The misfire determination device 10 detects a misfire in the unequal interval combustion engine 20 based on a rotation speed of the crankshaft 21.

The misfire determination device 10 of this embodiment also has a function as a control device that controls operations of the unequal interval combustion engine 20. The misfire determination device 10 is an electronic control unit (ECU). The misfire determination device 10 includes a combustion control unit 11. The combustion control unit 11 controls a combustion operation of the unequal interval combustion engine 20. Here, it may be acceptable that the misfire determination device 10 is separate from a control device that controls operations of the unequal interval combustion engine 20.

A rotation sensor 105 and a display device 30 are connected to the misfire determination device 10. The rotation sensor 105 is a sensor for acquiring a rotation speed of the crankshaft 21 of the unequal interval combustion engine 20. The rotation sensor 105 detects rotation of the crankshaft 21. The rotation sensor 105 outputs a signal upon detecting passage of the detection object part 25. The rotation sensor 105 outputs a signal each time the crankshaft 21 of the unequal interval combustion engine 20 is rotated through the arrangement angle.

The display device 30 is also connected to the misfire determination device 10. The display device 30 displays information outputted from the misfire determination device 10.

An intake pressure sensor, a fuel injection device, and a spark plug, all of which are not shown, are also connected to the misfire determination device 10.

The misfire determination device 10 includes an unequal interval combustion fluctuation canceled value acquisition unit 13, an unequal interval combustion fluctuation manifested value calculation unit 14, and a specific cylinder misfire determination unit 15. The misfire determination device 10 also includes a rotation speed acquisition unit 12.

Figure 2:
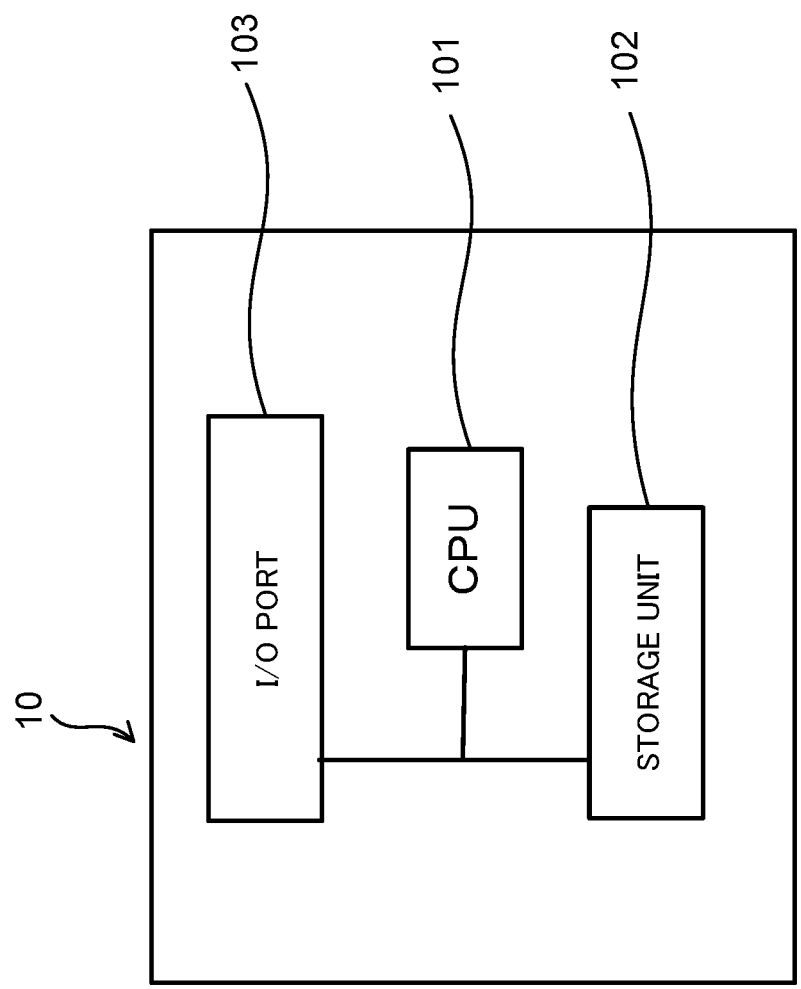
FIG. 2 is a block diagram showing a hardware configuration of the misfire determination device shown in FIG. 1.

FIG. 2 is a block diagram showing a hardware configuration of the misfire determination device 10 shown in FIG. 1.

The misfire determination device 10 includes a CPU 101, a storage unit 102, and an I/O port 103.

The CPU 101 executes a computing process based on a control program. The storage unit 102 stores the control program and information necessary for computation. The I/O port 103 inputs and outputs signals to and from an external device.

The rotation sensor 105 and the display device 30 (see FIG. 1) are connected to the I/O port 103.

The CPU 101 which executes the control program controls the hardware shown in FIG. 2, thus implementing each of the rotation speed acquisition unit 12, the unequal interval combustion fluctuation canceled value acquisition unit 13, the unequal interval combustion fluctuation manifested value calculation unit 14, the specific cylinder misfire determination unit 15, a misfire announcing unit 19, and the combustion control unit 11, shown in FIG. 1.

The rotation speed acquisition unit 12 shown in FIG. 1 acquires a rotation speed (OMG) of the crankshaft 21 based on an output of the rotation sensor 105. The rotation speed of the crankshaft 21 is the rotation speed of the unequal interval combustion engine 20. The rotation speed acquisition unit 12 acquires a crank angle signal indicating the rotation angle of the crankshaft 21 from the rotation sensor 105. The rotation speed acquisition unit 12 acquires the rotation speed of the crankshaft 21 based on the signal supplied from the rotation sensor 105. The rotation speed acquisition unit 12 acquires a rotation speed at least at a determination angle position. The determination angle position is set for each detection object cylinder. Since the unequal interval combustion engine 20 includes a plurality of cylinders, a plurality of determination angle positions are set in 720 crank angle degrees. For every 720 crank angle degrees, the rotation speed acquisition unit 12 acquires a rotation speed at the plurality of determination angle positions. Details of the determination angle position will be described later.

The unequal interval combustion fluctuation canceled value acquisition unit 13 acquires an unequal interval combustion fluctuation canceled value (NEOMG) based on the crank angle signal while the unequal interval combustion engine 20 is in operation. The unequal interval combustion fluctuation canceled value is a rotation speed value in which a fluctuation component attributable to unequal interval combustion is canceled from the rotation speed of the crankshaft 21. The unequal interval combustion fluctuation canceled value is a rotation speed in a section of 720×m crank angle degrees including a predetermined determination angle position. Here, m is a natural number. This embodiment will be described mainly on the assumption that m is one.

Specifically, the unequal interval combustion fluctuation canceled value acquisition unit 13 acquires a rotation speed in a section of 720×m crank angle degrees including a determination angle position, as the unequal interval combustion fluctuation canceled value. A plurality of determination angle positions are set in a range of 720 crank angle degrees. Thus, the unequal interval combustion fluctuation canceled value acquisition unit 13 acquires a plurality of unequal interval combustion fluctuation canceled values for every 720 crank angle degrees.

Figure 3:
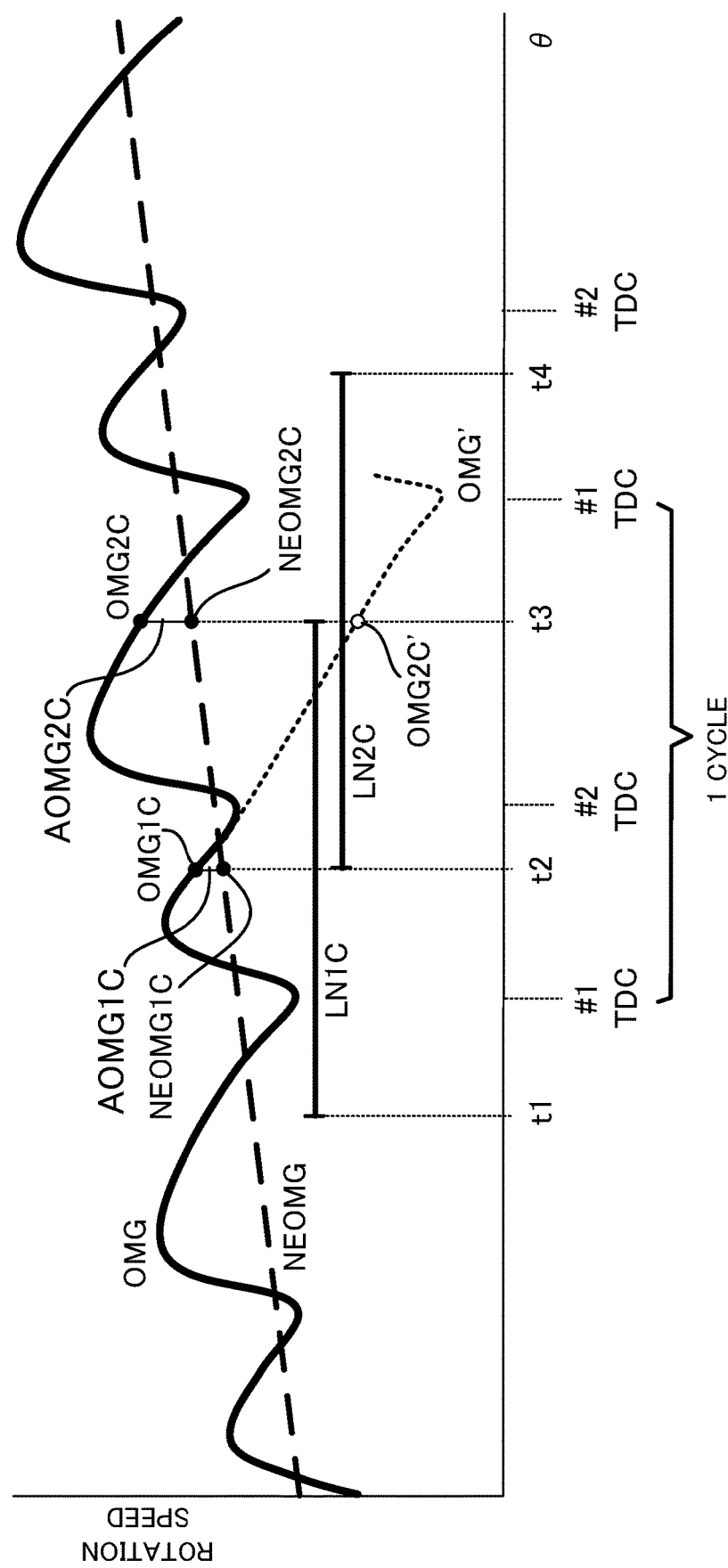
FIG. 3 is a graph schematically showing a rotation speed of a crankshaft rotated by an unequal interval combustion engine.

FIG. 3 is a graph schematically showing the rotation speed of the crankshaft 21 rotated by the unequal interval combustion engine 20.

In FIG. 3, the horizontal axis represents a rotation angle $\theta$ of the crankshaft 21, and the vertical axis represents the rotation speed.

In FIG. 3, the solid line indicates the rotation speed OMG in a case where no misfire occurs while the unequal interval combustion engine 20 is in operation. The rotation speed OMG is formed by connecting rotation speeds OMG into a curved line, each of the rotation speeds OMG being acquired upon passage of each detection object part 25. The rotation speed OMG of FIG. 3 is a rotation speed at every arrangement angle. That is, the rotation speed OMG of FIG. 3 represents an instantaneous rotation speed.

In an example shown in FIG. 3, the rotation speed OMG repeats an increase due to combustion in each cylinder 20a, 20b and a decrease after the combustion. In the unequal interval combustion engine 20 (see FIG. 1), each of the plurality of cylinders 20a, 20b causes one combustion within a period of one cycle. For example, the period of one cycle has combustion that starts at compression top dead center (#1TDC) of the first cylinder 20a and combustion that starts at compression top dead center (#2TDC) of the second cylinder 20b.

In Description herein, the compression top dead center (#1TDC) of the first cylinder 20a serves as a delimiter of one cycle.

In the unequal interval combustion engine 20, a rotation angle from the compression top dead center (#1TDC) of the first cylinder 20a to the subsequent compression top dead center (#2TDC) of the second cylinder 20b is different from a rotation angle from the compression top dead center (#2TDC) of the second cylinder 20b to the subsequent compression top dead center (#1TDC) of the first cylinder 20a. In the unequal interval combustion engine 20, in the same cycle, the height of a rotation speed peak caused by combustion in the first cylinder 20a is different from the height of a rotation speed peak caused by combustion in the second cylinder 20b.

In FIG. 3, the fine dotted line indicates an exemplary rotation speed OMG' in a case of a misfire occurring in the second cylinder 20b. In a case of a misfire occurring in a cylinder, an increment of the rotation speed corresponding to the cylinder where the misfire has occurred is smaller as compared with when no misfire occurs. Specifically, the rotation speed corresponding to the cylinder where the misfire has occurred decreases.

Basically, the specific cylinder misfire determination unit 15 determines a misfire based on a rotation speed at a determination angle position that is set for each cylinder. Each determination angle position is set to an angle position where an influence of combustion in a corresponding cylinder is likely to be reflected in the rotation speed.

In the misfire determination device 10 of this embodiment, an angle position t2 is set as the determination angle position corresponding to the first cylinder. The specific cylinder misfire determination unit 15 determines a misfire in the first cylinder based on a rotation speed at the determination angle position t2. An angle position t3 is set as the determination angle position corresponding to the second cylinder. The specific cylinder misfire determination unit 15 determines a misfire in the second cylinder based on a rotation speed at the determination angle position t3.

The determination angle position corresponding to each cylinder is a fixed angle position in one cycle. The determination angle position corresponding to each cylinder comes once in each cycle of the unequal interval combustion engine 20.

In the unequal interval combustion engine 20, as mentioned above, the height of a rotation speed peak caused by combustion in the first cylinder 20a and the height of a rotation speed peak caused by combustion in the second cylinder 20b are different from each other even when no misfire occurs.

The specific cylinder misfire determination unit 15 of this embodiment determines a misfire based on a difference between a rotation speed at a determination angle position corresponding to a cylinder and a reference angle position that is set independently of the determination angle position. This can reduce a deterioration in determination accuracy which can otherwise be caused by a difference in the rotation speed among the plurality of cylinders.

A fluctuation in the rotation speed OMG shown in FIG. 3 contains a fluctuation that is different from a repetition of increase and decrease which is attributable to combustion and that is also different from a difference in peak heights which is attributable to unequal interval combustion. In FIG. 3, for example, a plurality of peaks caused by combustion in the first cylinder 20a are expressed. The height of a peak caused by combustion in the first cylinder 20a gradually rises. Such a fluctuation in the rotation speed is attributable to a fluctuation in intake air amount which is caused by a driver's operation for example, or to a fluctuation in load applied to the engine.

Thus, the fluctuation attributable to unequal interval combustion contains a fluctuation as indicated by the broken line NEOMG. Under this state, in spite of an attempt to remove an influence of the peak height differences among cylinders from the determination, it is difficult to appropriately remove the influence. This lowers the accuracy of the misfire determination in the unequal interval combustion engine 20.

In the misfire determination device 10 of this embodiment, a rotation speed fluctuation attributable to unequal interval combustion is manifested by the unequal interval combustion fluctuation canceled value acquisition unit 13 and the unequal interval combustion fluctuation manifested value calculation unit 14 shown in FIG. 1.

First, the unequal interval combustion fluctuation manifested value calculation unit 14 removes, from the rotation speed OMG at the determination angle position, an unequal interval combustion fluctuation canceled value NEOMG acquired by the unequal interval combustion fluctuation canceled value acquisition unit 13. The unequal interval combustion fluctuation canceled value NEOMG is a rotation speed in a section of 720×m crank angle degrees including the determination angle position, as mentioned above. The unequal interval combustion fluctuation manifested value calculation unit 14 removes the unequal interval combustion fluctuation canceled value from the rotation speed at the determination angle position, to calculate an unequal interval combustion fluctuation manifested value AOMG (AOMG1C, AOMG2C) in which the fluctuation component attributable to unequal interval combustion is manifested.

The specific cylinder misfire determination unit 15 determines a misfire based on the unequal interval combustion fluctuation manifested value AOMG calculated by the unequal interval combustion fluctuation manifested value calculation unit 14 while the unequal interval combustion engine 20 is in operation.

The specific cylinder misfire determination unit 15 includes a difference calculation unit 16, an equalization processing unit 17, and a determination unit 18. Details of the difference calculation unit 16, the equalization processing unit 17, and the determination unit 18 will be described later.

Figure 4:
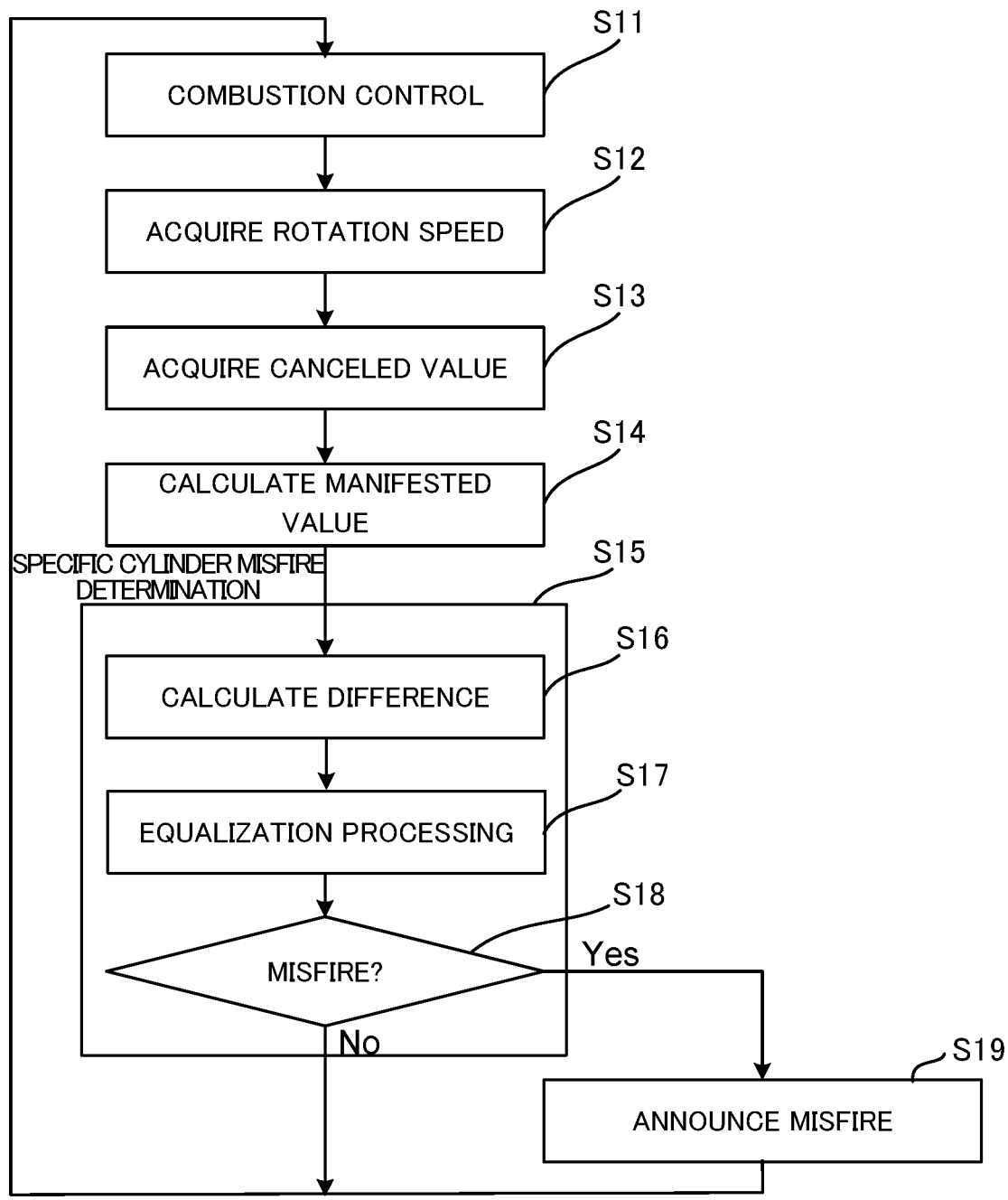
FIG. 4 is a flowchart of operations of the misfire determination device shown in FIG. 2.

FIG. 4 is a flowchart of operations of the misfire determination device 10 shown in FIG. 2.

The misfire determination device 10 repeatedly executes processing shown in FIG. 4.

In the misfire determination device 10, first, the combustion control unit 11 controls a combustion operation of the unequal interval combustion engine 20 (S11). Then, the rotation speed acquisition unit 12 acquires a rotation speed OMG of the crankshaft 21 of the unequal interval combustion engine 20 (S12). Then, the unequal interval combustion fluctuation canceled value acquisition unit 13 acquires an unequal interval combustion fluctuation canceled value NEOMG (S13). Then, the unequal interval combustion fluctuation manifested value calculation unit 14 removes the unequal interval combustion fluctuation canceled value NEOMG acquired by the unequal interval combustion fluctuation canceled value acquisition unit 13 from the rotation speed OMG at the determination angle position, to calculate an unequal interval combustion fluctuation manifested value AOMG (S14). The unequal interval combustion fluctuation manifested value AOMG is a rotation speed in which an unequal interval combustion fluctuation is manifested. Then, the specific cylinder misfire determination unit 15 determines a misfire in a specific cylinder of the unequal interval combustion engine 20 (S15). More specifically, in step S15, the difference calculation unit 16 calculates a difference between rotation speeds acquired at different angle positions (S16). Then, the equalization processing unit 17 equalizes the difference (S17). Then, the determination unit 18 determines the presence or absence of a misfire based on an equalized difference (S18).

Each of the rotation speed acquisition unit 12, the unequal interval combustion fluctuation canceled value acquisition unit 13, the specific cylinder misfire determination unit 15, the difference calculation unit 16, the equalization processing unit 17, and the determination unit 18 executes data processing when its processing object data becomes processable.

If the specific cylinder misfire determination unit 15 determines that a misfire has occurred in the specific cylinder (S18: Yes), the misfire announcing unit 19 announces the presence of a misfire (S19). If the specific cylinder misfire determination unit 15 does not determine the presence of a misfire (S18: No), the misfire announcing unit 19 does not perform announcement.

The order in which the combustion control unit 11, the rotation speed acquisition unit 12, the unequal interval combustion fluctuation canceled value acquisition unit 13, the specific cylinder misfire determination unit 15, and the misfire announcing unit 19 are operated is not limited to the one shown in FIG. 4. Processing in some of the units may be collectively executed by computing an expression to acquire one value. It may not be always necessary that the misfire announcing unit 19 announces the presence of a misfire whenever the specific cylinder misfire determination unit 15 determines the presence of a misfire. For example, it may be acceptable that the specific cylinder misfire determination unit 15 stores a determination result indicating the presence of a misfire each time the specific cylinder misfire determination unit 15 determines the presence of a misfire, and the misfire announcing unit 19 announces the presence of a misfire if the determination result indicating the presence of a misfire, which is stored by the specific cylinder misfire determination unit 15, satisfies a predetermined condition.

Details of the units shown in FIG. 1 and FIG. 3 will now be described.

[Rotation Speed Acquisition Unit]

The rotation speed acquisition unit 12 acquires a rotation speed of the crankshaft 21 based on a signal supplied from the rotation sensor 105 (see FIG. 1). The rotation speed acquisition unit 12 acquires a rotation speed by measuring a time interval of signal outputs from the rotation sensor 105. The rotation speed acquisition unit 12 also acquires an angle position of the crankshaft 21 based on a signal supplied from the rotation sensor 105.

In the misfire determination device 10, a plurality of determination angle positions each corresponding to each of the plurality of cylinders are set within one cycle. Thus, the rotation speed acquisition unit 12 acquires rotation speeds at the plurality of determination angle positions within one cycle. For example, the rotation speed acquisition unit 12 of this embodiment acquires rotation speeds OMG1C and OMG2C at two determination angle positions t2, t3 corresponding to the two cylinders 20a, 20b within one cycle.

As the rotation speed OMG at the angle position t2, for example, the rotation speed acquisition unit 12 acquires a rotation speed OMG1C corresponding to an arrangement angle ranging from the detection object part 25 associated with the angle position t2 to the adjacent detection object part 25. In this case, an instantaneous rotation speed is obtained as the rotation speed OMG1C corresponding to the determination angle position t2.

Here, the rotation speed acquisition unit 12 may be configured to acquire a rotation speed in a period corresponding to detection of three or more detection object parts 25, as the rotation speed OMG1C at the angle position t2. In other words, the rotation speed acquisition unit 12 may acquire a rotation speed corresponding to a section that extends over a plurality of arrangement angles, as the rotation speed OMG1C. That is, the rotation speed acquisition unit 12 may acquire a rotation speed in a predetermined angle range including a determination angle position, as a rotation speed at the determination angle position. For example, the rotation speed acquisition unit 12 may acquire a rotation speed in a range of 360 degrees centered at the determination angle position, as a rotation speed at the determination angle position t2. In this case, the rotation speed acquisition unit 12 acquires a rotation speed based on a time interval from (t1) when the detection object part 25 arranged 180 degrees before the detection object part 25 associated with the determination angle position t2 is detected by the rotation sensor 105 to (t3) when the same detection object part 25 is detected after one rotation of the crankshaft 21. In this configuration, one detection object part 25 is detected twice to acquire a rotation speed.

The rotation speed acquisition unit 12 of this embodiment acquires a rotation speed at a reference angle position which is different from the determination angle position. One reference angle position is set for each one of the determination angle positions.

The reference angle position is set at a position different from a determination angle position corresponding to a certain cylinder. The reference angle position corresponding to one cylinder may be the same as a determination angle position corresponding to another cylinder. For example, in this embodiment, the reference angle position corresponding to the second cylinder 20b is the same as the determination angle position t2 corresponding to the first cylinder 20a. In this embodiment, the reference angle position corresponding to the first cylinder 20a is the same as the determination angle position t1 corresponding to the second cylinder 20b in the previous cycle.

In this embodiment, a rotation speed at the determination angle position and a rotation speed at the reference angle position for each of the two cylinders can be covered by rotation speeds at two positions per one cycle.

A reference angle position corresponding to a determination angle position is preset in consideration of a value obtained by removing a rotation speed (reference fluctuation canceled value) in a section of 720 crank angle degrees centered at the reference angle position from a rotation speed at the reference angle position. More specifically, a reference angle position is such a position that a value obtained by removing a reference fluctuation canceled value from a rotation speed at the reference angle position is opposite in plus/minus sign to an unequal interval combustion fluctuation manifested value at a determination angle position obtained in a case of a misfire occurring. For example, the fine dotted line of FIG. 3 indicates a rotation speed OMG' in a case of a misfire occurring in the second cylinder 20b. A reference angle position corresponding to the determination angle position t3 for the second cylinder 20b is set to t2. A value (OMG1C–NEOMG1C) obtained by removing a reference fluctuation canceled value NEOMG1C in a section of 720 crank angle degrees centered at the reference angle position t2 from a reference rotation speed OMG1C at the angle position t2 is positive. An unequal interval combustion fluctuation manifested value (OMG2C'–NEOMG2C) at the determination angle position t3 for the second cylinder 20b is negative.

In the example described above, the reference angle position is set to the same position as the determination angle position, but the reference angle position is not limited to this. For example, a reference angle position for a determination angle position corresponding to one cylinder may be different from a determination angle position corresponding to another cylinder.

[Unequal Interval Combustion Fluctuation Canceled Value Acquisition Unit]

The unequal interval combustion fluctuation canceled value acquisition unit 13 acquires a rotation speed in a section of 720 crank angle degrees including a determination angle position, as an unequal interval combustion fluctuation canceled value.

The unequal interval combustion fluctuation canceled value acquisition unit 13 of this embodiment acquires rotation speeds NEOMG1C and NEOMG2C in sections of 720 crank angle degrees centered at the plurality of determination angle positions t2 and t3, respectively.

For example, referring to FIG. 3, the unequal interval combustion fluctuation canceled value acquisition unit 13 acquires the rotation speed NEOMG1C in a section LN1C of 720 crank angle degrees centered at the determination angle position t2 corresponding to the first cylinder 20a. The section LN1C of 720 crank angle degrees centered at the determination angle position t2 is a section from the angle position t1 to the angle position t3. The unequal interval combustion fluctuation canceled value acquisition unit 13 acquires the rotation speed NEOMG2C in a section LN2C of 720 crank angle degrees centered at the determination angle position t3 corresponding to the second cylinder 20b. The section LN2C of 720 crank angle degrees centered at the determination angle position t3 is a section from the angle position t2 to the angle position t4.

Figure 5:
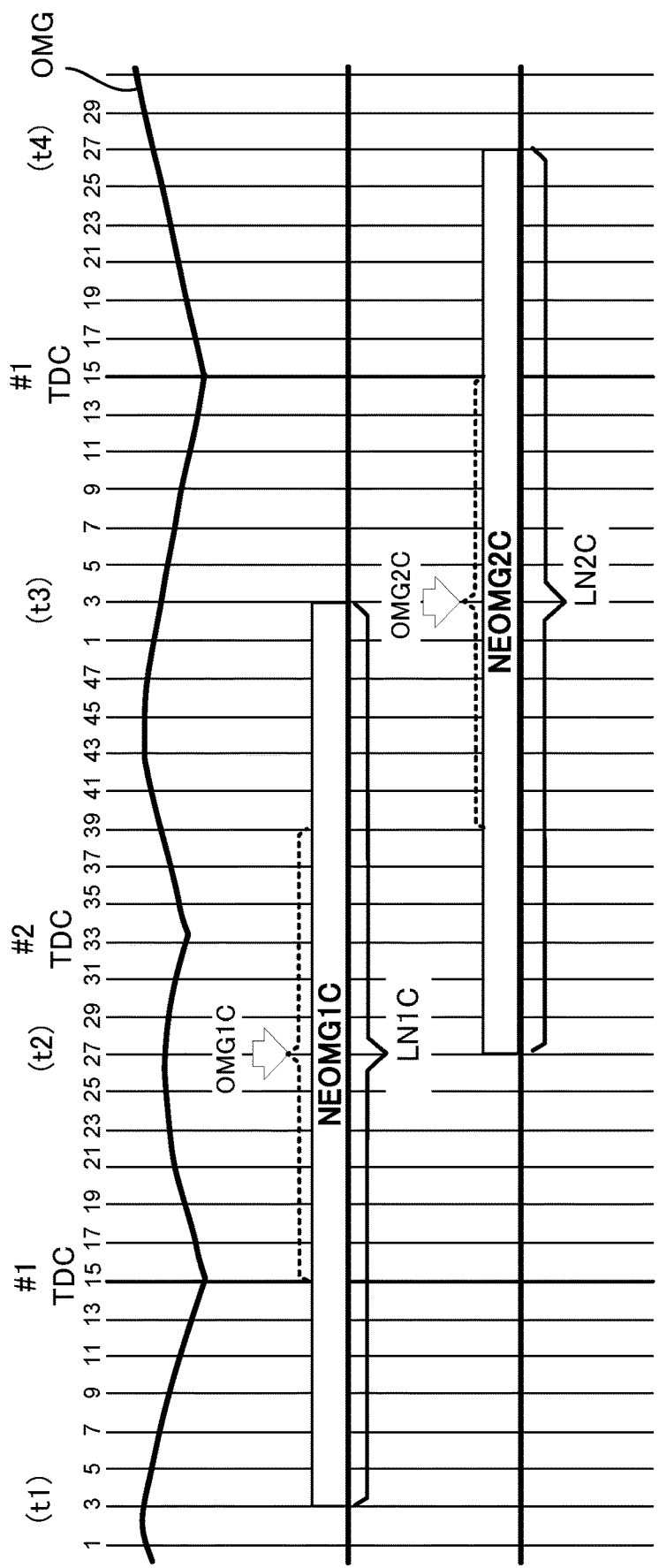
FIG. 5 is a graph enlarging a part of the rotation speed shown in FIG. 3.

FIG. 5 is a graph enlarging a part of the rotation speed shown in FIG. 3.

In FIG. 5, a part of the rotation speed OMG of FIG. 3 is shown with the horizontal axis enlarged. The horizontal axis of FIG. 5 as well as FIG. 3 represents the rotation angle of the crankshaft 21. On the horizontal axis of FIG. 5, numbers are given for identifying the detection object parts 25 provided in the crankshaft 21. The numbers shown are odd numbers. For example, the determination angle position t2 corresponding to the first cylinder 20a is associated with the detection object part 25 of No. 27. The detection object parts 25 of No. 25 to No. 47 are the same as the detection object parts 25 of No. 1 to No. 23, respectively. These detection object parts 25 are assigned different numbers for distinction of rotation angle positions in one cycle, that is, in two rotations of the crankshaft 21.

FIG. 5 also shows crank angle ranges, respectively for the unequal interval combustion fluctuation canceled values NEOMG1C and NEOMG2C.

The unequal interval combustion fluctuation canceled value acquisition unit 13 acquires the rotation speed NEOMG2C in the section LN2C of 720 crank angle degrees including the determination angle position t3 corresponding to the second cylinder 20b. More specifically, the unequal interval combustion fluctuation canceled value acquisition unit 13 acquires a rotation speed from the angle position (t2) associated with the detection object part 25 of No. 27 to the angle position (t4) associated with the detection object part 25 of No. 27 that is detected next. The acquired rotation speed is an unequal interval combustion fluctuation canceled value NEOMG2C corresponding to the second cylinder 20b. That is, the unequal interval combustion fluctuation canceled value acquisition unit 13 acquires the unequal interval combustion fluctuation canceled value NEOMG2C based on a time in which the detection object part 25 of No. 27 (which is the same as No. 3) continuously passes three times.

The unequal interval combustion fluctuation canceled value acquisition unit 13 also acquires the rotation speed NEOMG1C in the section LN1C of 720 crank angle degrees including the determination angle position t2 corresponding to the first cylinder 20a. More specifically, the unequal interval combustion fluctuation canceled value acquisition unit 13 acquires a rotation speed from the angle position (t1) associated with the detection object part 25 of No. 3 to the angle position (t3) associated with the detection object part 25 of No. 3 that is detected next. The acquired rotation speed is an unequal interval combustion fluctuation canceled value NEOMG1C corresponding to the first cylinder 20a. That is, the unequal interval combustion fluctuation canceled value acquisition unit 13 acquires the unequal interval combustion fluctuation canceled value NEOMG1C based on a time in which the detection object part 25 of No. 3 (which is the same as No. 27) continuously passes three times.

Acquisition of a rotation speed by the rotation speed acquisition unit 12 will now be described with reference to FIG. 5.

As the rotation speed OMG1C at the determination angle position t2 corresponding to the first cylinder 20a, the rotation speed acquisition unit 12 acquires, for example, a rotation speed OMG1C from the angle position associated with the detection object part 25 of No. 25 to the angle position associated with the detection object part 25 of No. 27.

It may be also possible that the rotation speed acquisition unit 12 acquires, as the rotation speed OMG1C, a rotation speed over 360 degrees from the angle position associated with the detection object part 25 of No. 15 to the angle position associated with the detection object part 25 of No. 39. The detection object part 25 of No. 15 is the same as the detection object part 25 of No. 39. In this case, therefore, the rotation speed acquisition unit 12 acquires the rotation speed OMG1C at the determination angle position t2 based on a time in which the detection object part 25 of No. 15 (which is the same as No. 39) continuously passes twice.

As the rotation speed OMG2C at the determination angle position t3 corresponding to the second cylinder 20b, the rotation speed acquisition unit 12 acquires, for example, a rotation speed OMG2C from the angle position associated with the detection object part 25 of No. 1 to the angle position associated with the detection object part 25 of No. 3. It may be also possible that the rotation speed acquisition unit 12 acquires, as the rotation speed OMG2C, a rotation speed over 360 degrees from the angle position associated with the detection object part 25 of No. 39 to the angle position associated with the detection object part 25 of No. 15.

Referring to FIG. 3 again, the unequal interval combustion fluctuation canceled value will be described.

The rotation speed NEOMG shown in FIG. 3 indicates a rotation speed at a rotation angle θ in a section of 720 crank angle degrees centered at the rotation angle θ.

As the unequal interval combustion fluctuation canceled value NEOMG1C at the determination angle position t2, the unequal interval combustion fluctuation canceled value acquisition unit 13 acquires a rotation speed in the section LN1C of 720 crank angle degrees centered at the determination angle position t2. As the unequal interval combustion fluctuation canceled value NEOMG2C for the determination angle position t3, the unequal interval combustion fluctuation canceled value acquisition unit 13 acquires a rotation speed in the section LN2C of 720 crank angle degrees centered at the determination angle position t3.

As described above, the intervals of combustion in the cylinders included in the unequal interval combustion engine 20 are not equal. Any of the cylinders included in the unequal interval combustion engine 20 completes its one-cycle operation in 720 crank angle degrees. Thus, the unequal interval combustion fluctuation canceled value NEOMG which is a rotation speed in a section of 720 crank angle degrees is a value in which a fluctuation component attributable to unequal interval combustion is canceled. Each section of 720 crank angle degrees, for which the unequal interval combustion fluctuation canceled value NEOMG is acquired, includes the determination angle position (e.g., t2 and t3). Accordingly, a state of the section including the determination angle position is reflected in the unequal interval combustion fluctuation canceled value NEOMG The unequal interval combustion fluctuation canceled value acquisition unit 13 of this embodiment additionally acquires a rotation speed in a section of 720 crank angle degrees, as a reference fluctuation canceled value for a reference angle position. In this embodiment, as described above, the reference angle position (t2) corresponding to one cylinder (for example, the second cylinder 20b) is the same as the determination angle position (t2) corresponding to another cylinder (first cylinder 20a). Thus, when an unequal interval combustion fluctuation canceled value is acquired at a determination angle position, a reference fluctuation canceled value at a reference angle position corresponding to another cylinder is simultaneously acquired.

[Unequal Interval Combustion Fluctuation Manifested Value Calculation Unit]

The unequal interval combustion fluctuation manifested value calculation unit 14 removes the unequal interval combustion fluctuation canceled value NEOMG acquired by the unequal interval combustion fluctuation canceled value acquisition unit 13 from the rotation speed OMG at the determination angle position. In this manner, the unequal interval combustion fluctuation manifested value calculation unit 14 calculates the unequal interval combustion fluctuation manifested value AOMG (AOMG1C, AOMG2C). The unequal interval combustion fluctuation manifested value AOMG is a value in which a fluctuation component attributable to unequal interval combustion is manifested.

The unequal interval combustion fluctuation manifested value calculation unit 14 also removes an unequal interval combustion fluctuation canceled value from a rotation speed at a reference angle position. A value obtained by removing the unequal interval combustion fluctuation canceled value from the rotation speed at the reference angle position is a reference fluctuation manifested value AOMG. In this embodiment, a reference angle position for a determination angle position corresponding to one cylinder is the same as a determination angle position corresponding to another cylinder. In this embodiment, therefore, calculating an unequal interval combustion fluctuation manifested value AOMG at a determination angle position simultaneously gives a reference fluctuation manifested value AOMG at a reference angle position in which an unequal interval combustion fluctuation canceled value is removed.

Removal of the unequal interval combustion fluctuation canceled value NEOMG corresponding to each angle position from the rotation speed OMG at the angle position means that a fluctuation caused by an accelerator operation, acceleration, and deceleration are removed.

The unequal interval combustion fluctuation canceled value acquisition unit 13 described above acquires a rotation speed in a section of 720 (720×m; m=1) crank angle degrees, so that a fluctuation caused by an accelerator operation, acceleration, and deceleration is reflected in a combustion fluctuation canceled value NEOMG with a higher accuracy. As a result, in an unequal interval combustion fluctuation manifested value AOMG calculated by removing the unequal interval combustion fluctuation canceled value NEOMG from the rotation speed OMG, an influence of fluctuation caused by the accelerator operation, acceleration, and deceleration is removed to a larger extent.

[Specific Cylinder Misfire Determination Unit]

The specific cylinder misfire determination unit 15 determines a misfire based on an unequal interval combustion fluctuation manifested value calculated by the unequal interval combustion fluctuation manifested value calculation unit 14 while the unequal interval combustion engine 20 is in operation. The specific cylinder misfire determination unit 15 of this embodiment determines a misfire through the processing executed by the difference calculation unit 16, the equalization processing unit 17, and the determination unit 18.

The following configurations and operations of the difference calculation unit 16, the equalization processing unit 17, and the determination unit 18 can be considered as configurations and operations of the specific cylinder misfire determination unit 15.

The difference calculation unit 16 calculates a difference between an unequal interval combustion fluctuation manifested value and a reference fluctuation manifested value.

For example, to determine a misfire in the second cylinder 20b, the difference calculation unit 16 calculates a difference NDOMG2C between an unequal interval combustion fluctuation manifested value (OMG2C−NEOMG2C) for the second cylinder 20b and a reference fluctuation manifested value (OMG1C−NEOMG1C) for the second cylinder 20b. In this embodiment, the reference angle position for the second cylinder 20b is the same as the determination angle position t2 for the first cylinder. The reference fluctuation manifested value for the second cylinder, therefore, is the same as the unequal interval combustion fluctuation manifested value (OMG1C−NEOMG1C) for the first cylinder.

The difference thus calculated will be referred to as a first-order difference, because it is a difference between rotation speeds at two different positions.

In detail, the first-order difference is calculated based on the following expression:

$$NDOMG2C=(OMG1C-NEOMG1C)-(OMG2C-NEOMG2C),$$

where

OMG2C represents a rotation speed at a determination angle position;

NEOMG2C represents an unequal interval combustion fluctuation canceled value at the determination angle position;

OMG1C represents a rotation speed at a reference angle position; and

NEOMG1C represents an unequal interval combustion fluctuation canceled value at the reference angle position.

To determine a misfire in the first cylinder 20a, the difference calculation unit 16 calculates a first-order difference NDOMG1C between an unequal interval combustion fluctuation manifested value for the first cylinder 20a and a reference fluctuation manifested value for the first cylinder 20a. The reference angle position t1 for the first cylinder 20a is a position prior to the determination angle position t2 for the first cylinder 20a.

The first-order difference for the first cylinder 20a is calculated based on the following expression:

$$NDOMG1C=(OMG2C-NEOMG2C)-(OMG1C-NEOMG1C).$$

The equalization processing unit 17 equalizes, for each cylinder, a difference (first-order difference) between an unequal interval combustion fluctuation manifested value and a reference fluctuation manifested value, which difference is sequentially calculated by the difference calculation unit 16. For example, the difference calculation unit 16 calculates one first-order difference for the first cylinder 20a per one cycle of the unequal interval combustion engine 20. The equalization processing unit 17 cumulatively equalizes the value of the first-order difference thus calculated.

As a calculation process for equalization, for example, an exponential moving average process (smoothing process) is adopted. To be specific, the equalization processing unit 17 stores the difference calculated by the difference calculation unit 16 in the storage unit 102 (see FIG. 2), and calculates an average value based on the first-order difference calculated by the difference calculation unit 16 and the value stored in the storage unit 102 at a time of the previous determination.

The equalization process makes disturbance less influential to rotation of the crankshaft 21 for example, and enables misfires that continuously occur to be determined with a higher accuracy.

The determination unit 18 determines a misfire based on the equalization value calculated by the equalization processing unit 17. If the equalization value calculated by the equalization processing unit 17 exceeds a predetermined reference value, the determination unit 18 determines that a misfire has occurred in a corresponding cylinder. The determination unit 18 counts the number of times it is determined that a misfire has occurred. The reference value is a value prestored in the misfire determination device 10. The reference value is constituted by a map. The reference value is constituted by a map associated with, for example, a corresponding cylinder, a rotation speed, and an intake air pressure of the unequal interval combustion engine 20.

If the equalization value calculated by the equalization processing unit 17 exceeds a reference value selected in accordance with a cylinder, a rotation speed, and an intake air pressure, the determination unit 18 determines that a misfire has occurred in a corresponding cylinder.

Figure 6:
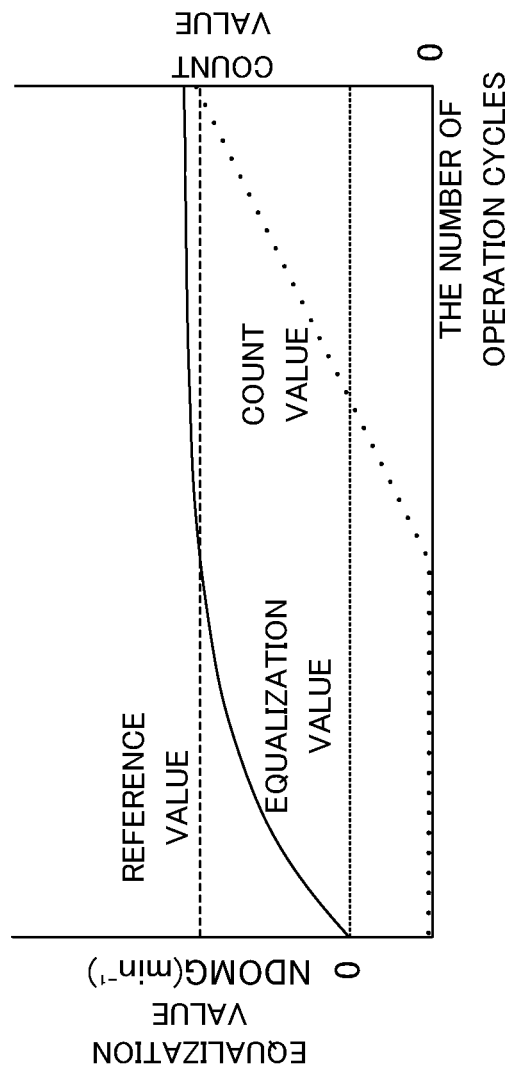
FIG. 6 is a graph illustrating an equalization value variation in a case of a misfire occurring.

FIG. 6 is a graph illustrating an equalization value variation in a case of a misfire occurring.

In FIG. 6, the horizontal axis represents the number of operation cycles of the unequal interval combustion engine 20. In the graph, the solid line indicates an equalization value NDOMG obtained through the processing executed by the equalization processing unit 17.

When continuous misfires occur in the first cylinder 20a, the equalization value NDOMG gradually increases along with the operation, due to the equalization process executed by the equalization processing unit 17.

If the equalization value NDOMG exceeds the reference value, the determination unit 18 determines that continuous misfires have occurred in a cylinder corresponding to this equalization value NDOMG. The determination unit 18 counts the number of times the equalization value NDOMG exceeds the reference value. In an example shown in FIG. 6, therefore, after the equalization value NDOMG exceeds the reference value, a count value increases as the number of cycles increases. The count value roughly indicates the number of times a misfire has occurred.

In this manner, the specific cylinder misfire determination unit 15 shown in FIG. 1 determines a misfire in a specific cylinder among the plurality of cylinders included in the unequal interval combustion engine 20, based on the unequal interval combustion fluctuation manifested value AOMG calculated by the unequal interval combustion fluctuation manifested value calculation unit 14.

[Misfire Announcing Unit]

The misfire announcing unit 19 announces the presence or absence of a misfire, which is determined by the specific cylinder misfire determination unit 15. If the presence of a misfire is determined by the specific cylinder misfire determination unit 15, the misfire announcing unit 19 directs the display device 30 (see FIG. 1) to display the presence of a misfire. The misfire announcing unit 19 also directs the display device 30 to display the count value counted by the determination unit 18, as the number of times a misfire has occurred.

In this embodiment, the unequal interval combustion fluctuation canceled values NEOMG1C, NEOMG2C are removed from the rotation speeds OMG1C, OMG2C at the determination angle positions t2, t3 corresponding to the cylinders 20a, 20b, to calculate the unequal interval combustion fluctuation manifested value AMOG (AOMG1C=OMG1C−NEOMG1C; AOMG2C=OMG2C−NEOMG2C).

In the unequal interval combustion fluctuation manifested value (AOMG), a combustion state in a section including the determination angle position is reflected with a high accuracy. In the unequal interval combustion fluctuation manifested value, therefore, a fluctuation in a case of a misfire occurring appears more prominently.

Figure 7:
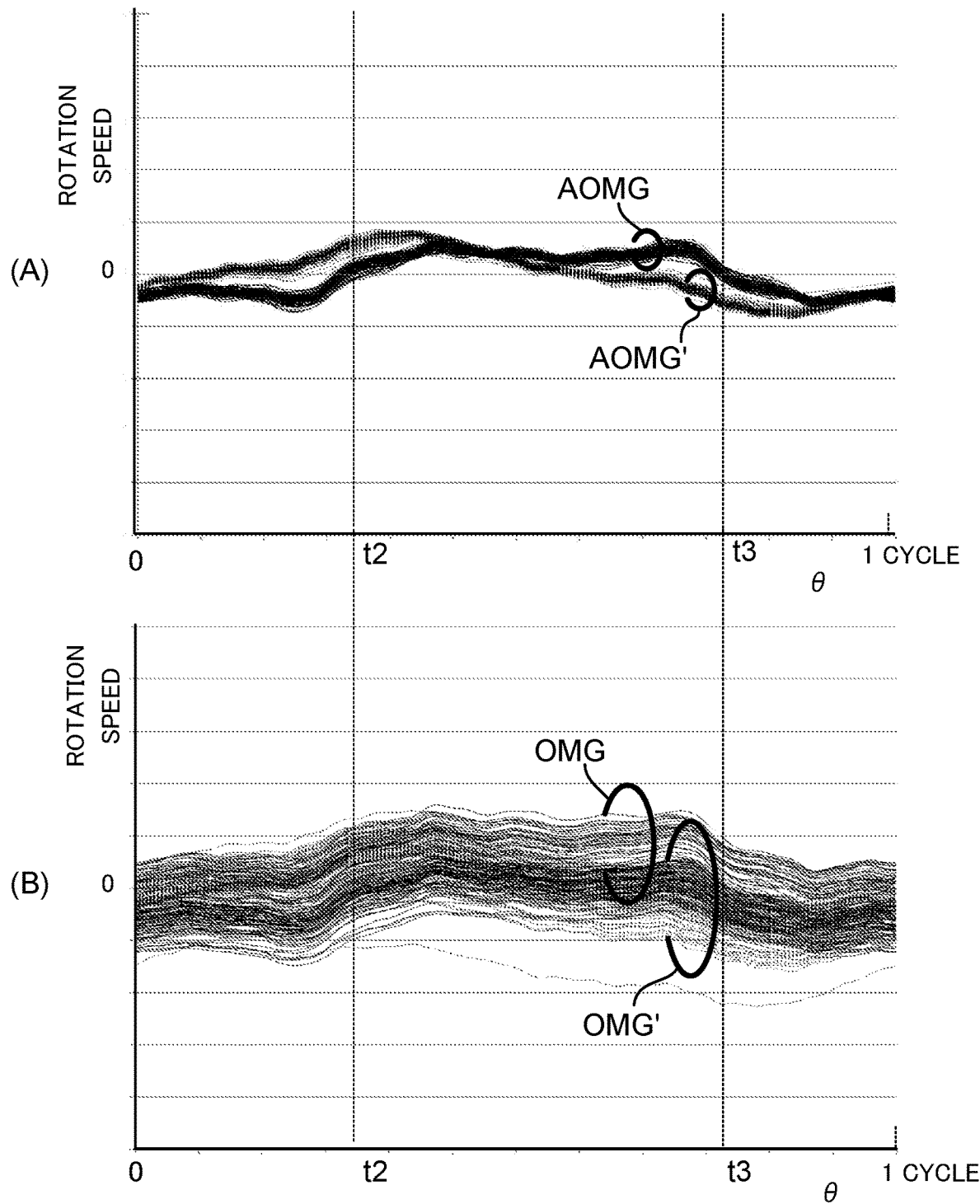
FIG. 7 depicts graphs showing rotation speed variations in a case of a misfire occurring in a second cylinder and in a case of a normal state having no misfire.

FIG. 7 contains graphs showing rotation speed variations in a case of a misfire occurring in a second cylinder and in a case of a normal state having no misfire.

The part (A) of FIG. 7 shows a rotation speed (unequal interval combustion fluctuation manifested value) AOMG after the processing is executed by the unequal interval combustion fluctuation manifested value calculation unit 14. The part (B) of FIG. 7 shows a rotation speed OMG before the processing is executed by the unequal interval combustion fluctuation manifested value calculation unit 14. In FIG. 7, measured values of rotation speeds in a plurality of cycle are superimposed. FIG. 7 shows a rotation speed variation over a continuous angle position range, not limited to a position where the misfire determination device 10 actually acquires a rotation speed, for the purpose of illustrating manifestation of a fluctuation caused by unequal interval combustion. In FIG. 7, for each rotation angle, a rotation speed in an angle range of 360 degrees centered at this angle is indicated as the rotation speed OMG. In the graphs, the broken line indicates a rotation speed in a case of a misfire occurring, and the solid line indicates a rotation speed in a normal state having no misfire.

As shown in the part (B) of FIG. 7, the rotation speed OMG, OMG' before the processing is executed by the unequal interval combustion fluctuation manifested value calculation unit 14 exhibits a rotation speed fluctuation in a wide range.

For example, the rotation speed OMG in a normal state before the processing is executed contains a repetition of increase and decrease within one cycle, which is attributable to combustion. In a case of a misfire occurring, the rotation speed OMG' at the determination angle position t3 corresponding to the second cylinder tends to be lower than in a case of the normal state. The rotation speed OMG, OMG' before the processing is executed by the unequal interval combustion fluctuation manifested value calculation unit 14 exhibits a large fluctuation (variability) which exceeds a cycle period. Thus, using only the rotation speeds OMG, OMG' before the processing is executed provides a low accuracy to the misfire determination.

As shown in the part (A) of FIG. 7, the rotation speed AOMG, AOMG' obtained after the processing is executed by the unequal interval combustion fluctuation manifested value calculation unit 14 has a suppressed variability for each cycle.

As a result, in the rotation speed (unequal interval combustion fluctuation manifested value) AOMG, AOMG', a fluctuation caused by unequal interval combustion is manifested more largely. Using the rotation speeds AOMG, AOMG' in which the unequal interval combustion fluctuation is manifested enables a decrease of the value at the determination angle position t3 corresponding to the second cylinder to be determined with a high accuracy.

Particularly, a first-order difference between the rotation speed AOMG' at the determination angle position t3 corresponding to the second cylinder 20b and the rotation speed AOMG' at the reference angle position t2 corresponding to the determination angle position t3, which difference is obtained in a case of a misfire occurring in the second cylinder 20b, is larger than a first-order difference in the rotation speed AOMG which is obtained when no misfire occurs.

In this manner, a misfire in the second cylinder 20b of the unequal interval combustion engine 20 can be determined with a high accuracy, based on the rotation speed AOMG in which a fluctuation caused by unequal interval combustion is manifested by the unequal interval combustion fluctuation manifested value calculation unit 14.

In the misfire determination device 10 of this embodiment, moreover, the rotation speed AOMG in which a fluctuation caused by unequal interval combustion is manifested is used to determine a misfire based on a first-order difference between the rotation speed at the determination angle position t3 and the rotation speed at the reference angle position t2. Accordingly, a misfire in the second cylinder 20b of the unequal interval combustion engine 20 can be determined with a higher accuracy.

Figure 8:
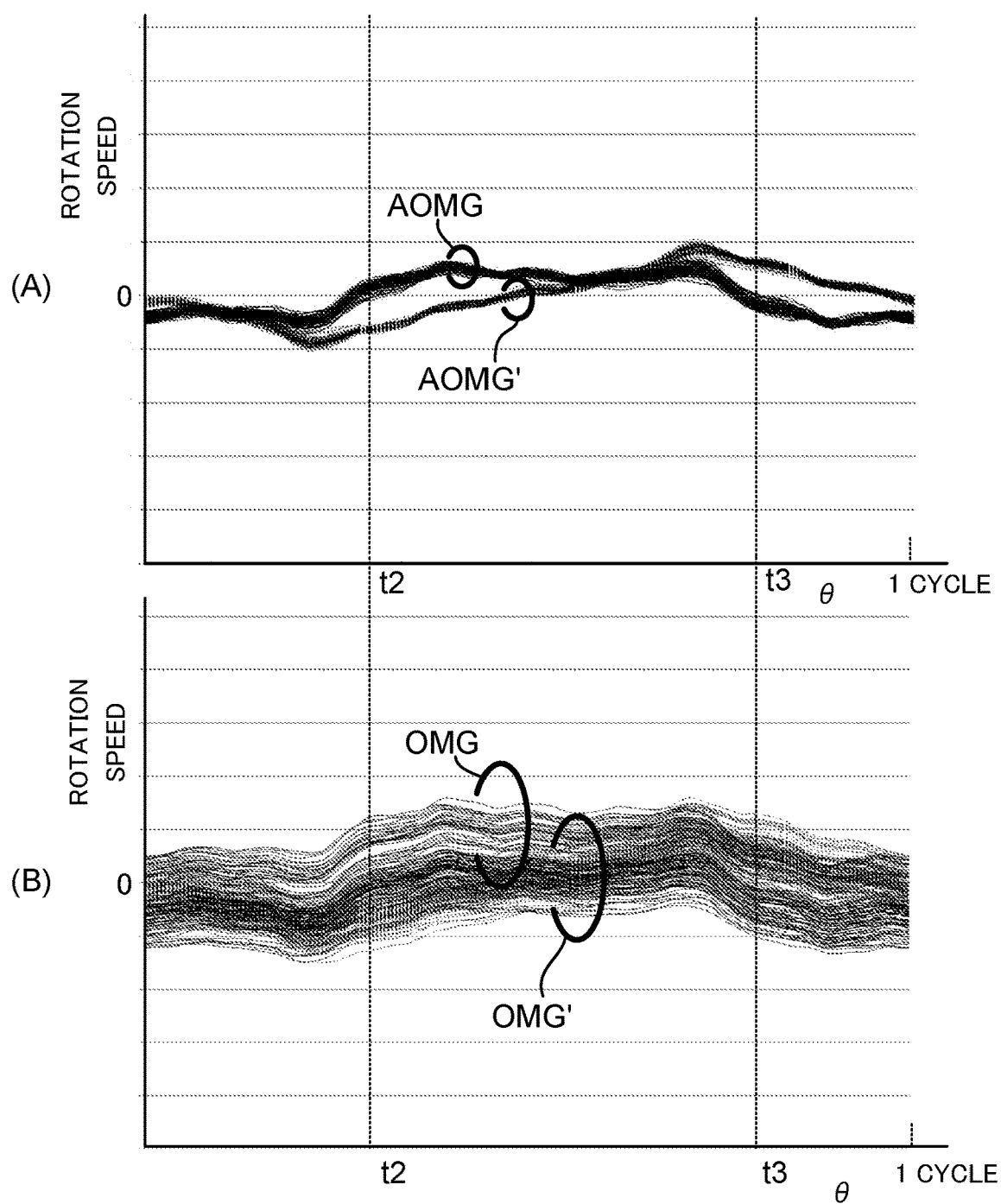
FIG. 8 depicts graphs showing rotation speed variations in a case of a misfire occurring in a first cylinder and in a case of a normal state having no misfire.

FIG. 8 contains graphs showing rotation speed variations in a case of a misfire occurring in a first cylinder and in a case of a normal state having no misfire.

The part (A) of FIG. 8 shows a rotation speed after the processing is executed by the unequal interval combustion fluctuation manifested value calculation unit 14. The part (B) of FIG. 8 shows a rotation speed before the processing is executed by the unequal interval combustion fluctuation manifested value calculation unit 14.

Even in a case of a misfire occurring in the first cylinder 20a, the rotation speed AOMG, AOMG' obtained after the processing is executed by the unequal interval combustion fluctuation manifested value calculation unit 14 has a suppressed variability for each cycle, as shown in the part (A) of FIG. 8.

Accordingly, a misfire in the first cylinder 20a of the unequal interval combustion engine 20 can be determined with a high accuracy, based on the rotation speed AOMG in which a fluctuation caused by unequal interval combustion is manifested by the unequal interval combustion fluctuation manifested value calculation unit 14.

In the misfire determination device 10 of this embodiment, moreover, the rotation speed AOMG in which a fluctuation caused by unequal interval combustion is manifested is used to determine a misfire based on a first-order difference between the rotation speed at the determination angle position t3 and the rotation speed at the reference angle position t2. Accordingly, a misfire in the first cylinder 20a of the unequal interval combustion engine 20 can be determined with a higher accuracy.

Second Embodiment

Figure 9:
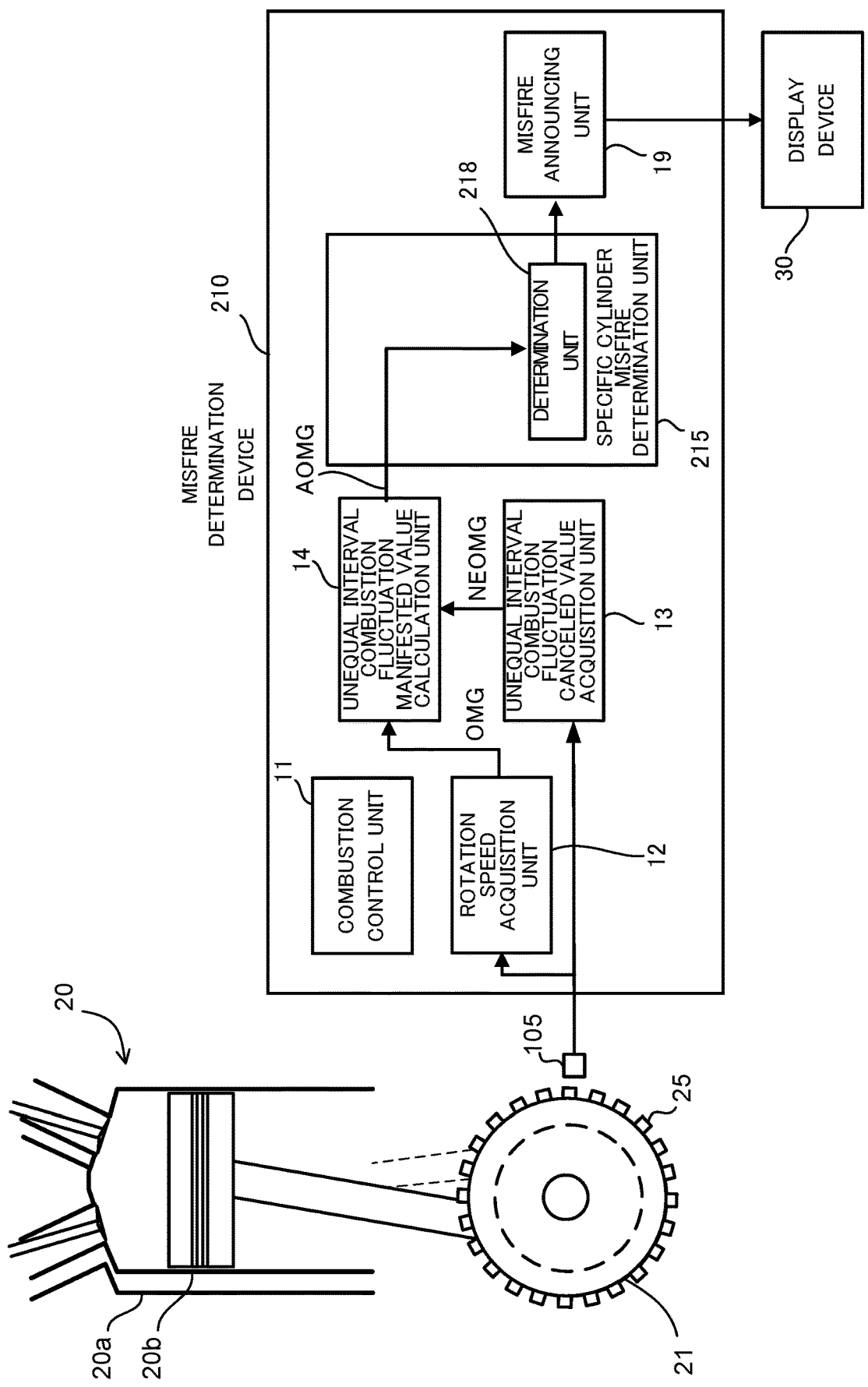
FIG. 9 is a diagram schematically showing configurations of an unequal interval combustion engine misfire determination device and its peripheral devices according to a second embodiment of the present teaching.

FIG. 9 is a configuration diagram schematically showing configurations of an unequal interval combustion engine misfire determination device and its peripheral devices according to a second embodiment of the present teaching.

An unequal interval combustion engine misfire determination device 210 (misfire determination device 210) of this embodiment includes a specific cylinder misfire determination unit 215, similarly to the first embodiment. The specific cylinder misfire determination unit 215, however, does not include a difference calculation unit and an equalization processing unit.

Figure 10:
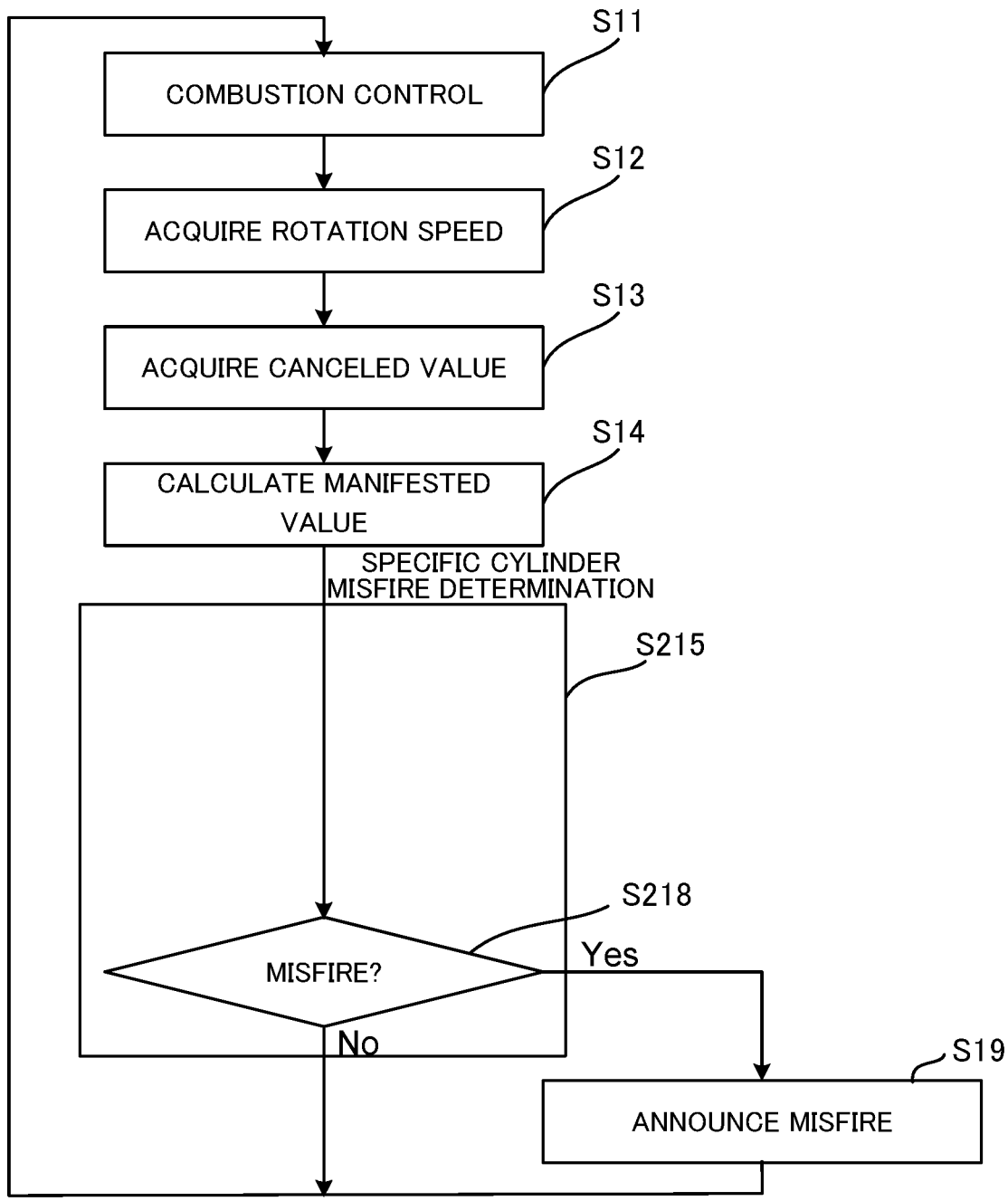
FIG. 10 is a flowchart of operations of the misfire determination device shown in FIG. 9.

FIG. 10 is a flowchart of operations of the misfire determination device 210 shown in FIG. 9.

In this embodiment, processing is executed by neither a difference calculation unit nor an equalization processing unit. Processing (S218) executed by a determination unit 218 is different from that of the first embodiment. Except for these points, the second embodiment is identical to the first embodiment. In descriptions of the second embodiment, therefore, the same drawings and reference signs as mentioned in the first embodiment are used.

The specific cylinder misfire determination unit 215 of this embodiment does not calculate a first-order difference, though it is calculated in the first embodiment.

The determination unit 218 of the specific cylinder misfire determination unit 215 determines a misfire based on comparison of an unequal interval combustion fluctuation manifested value AOMG calculated by the unequal interval combustion fluctuation manifested value calculation unit 14 against a predetermined reference value.

The unequal interval combustion fluctuation manifested value calculation unit 14 calculates an unequal interval combustion fluctuation manifested value AOMG2C at a determination angle position t3 (see FIG. 3), based on the following expression:

$$AOMG2C = OMG2C - NEOMG2C$$

The determination unit 218 of the specific cylinder misfire determination unit 215 detects a misfire based on whether or not the calculated unequal interval combustion fluctuation manifested value AOMG2C exceeds a predetermined reference value. The reference value is a value prestored in the misfire determination device 10. The reference value is constituted by a map. In detail, the reference value is constituted by a map associated with, for example, a corresponding cylinder, a rotation speed, and an intake air pressure of the unequal interval combustion engine 20.

If the unequal interval combustion fluctuation manifested value AOMG2C exceeds a reference value selected in accordance with a cylinder, a rotation speed, and an intake air pressure, the determination unit 218 determines that a misfire has occurred in a corresponding cylinder.

In this embodiment, a misfire in a specific cylinder of the unequal interval combustion engine 20 can be determined with a high accuracy, based on the rotation speed AOMG in which a fluctuation caused by unequal interval combustion is manifested by the unequal interval combustion fluctuation manifested value calculation unit 14.

In this embodiment, additionally, occurrence of continuous misfires and a single misfire can be determined.

Third Embodiment

A third embodiment of the present teaching will now be described.

An unequal interval combustion engine misfire determination device of this embodiment is different from that of the first embodiment in terms of an operation of the difference calculation unit 16 of the specific cylinder misfire determination unit 15. Except for this point, this embodiment is identical to the first embodiment. In descriptions of this embodiment, therefore, the same drawings and reference signs as mentioned in the first embodiment are used.

The difference calculation unit 16 of this embodiment calculates a so-called second-order difference.

Similarly to the first embodiment, the difference calculation unit 16 calculates a difference NDOMG2C between an unequal interval combustion fluctuation manifested value (OMG2C−NEOMG2C) and a reference fluctuation manifested value (OMG1C−NEOMG1C) for the second cylinder 20b. Furthermore, the difference calculation unit 16 calculates a difference between the difference NDOMG2C thus calculated and a difference NDOMG2C calculated one cycle before. Thus, the difference calculation unit 16 calculates a second-order difference.

The specific cylinder misfire determination unit 15 determines a misfire for the second cylinder 20b based on the second-order difference thus calculated. Since a misfire is determined based on the second-order difference, occurrence of a misfire can be determined with a higher accuracy.

The first to third embodiments have been described above can be combined. For example, providing both the difference calculation unit 16 of the first embodiment and the difference calculation unit 216 of the second embodiment makes it possible to determine both continuous misfires and a single misfire with a high accuracy. It may be acceptable that, for example, both the difference calculation unit 16 of the first embodiment and the difference calculation unit 16 of the third embodiment are provided.

Although the first to third embodiments illustrate misfire determinations in a two-cylinder engine, these misfire determinations are applicable to an unequal interval explosion combustion engine including three or more cylinders, too.

In a case of a four-cylinder engine for example, a rotation speed and an unequal interval combustion fluctuation canceled value are acquired at each of four determination angle positions. In a misfire determination using a rotation speed and an unequal interval combustion fluctuation canceled value acquired at each reference angle position, part or all of the reference angle positions may be the same as determination angle positions.

[Straddled Vehicle]

FIG. 11 is a diagram showing an external appearance of a straddled vehicle equipped with the misfire determination device 10 (210) according to any of the first to third embodiments.

The straddled vehicle 50 means a type of vehicle in which a driver strides a saddle when seated.

The straddled vehicle 50 shown in FIG. 11 is a motorcycle. The straddled vehicle 50 shown in FIG. 11 includes a vehicle body 51 and a plurality of wheels 52. The vehicle body 51 supports the wheels 52. The two wheels 52 shown in FIG. 11 are provided to the vehicle body 51 of the straddled vehicle 50, and are arranged one behind the other in a front-rear direction X of the straddled vehicle 50.

The vehicle body 51 is provided with the misfire determination device 10 and the unequal interval combustion engine 20. The unequal interval combustion engine 20 drives the wheels 52. A driving force of the unequal interval combustion engine 20 is transmitted to the wheel 52 via a transmission 58 and a chain 59. The straddled vehicle 50 is not provided with a pair of left and right drive wheels, and is not provided with a differential gear which would be provided in a drive wheel of a common automobile or the like.

The misfire determination device 10 controls the unequal interval combustion engine 20. The misfire determination device 10 detects a misfire in the unequal interval combustion engine 20 based on the rotation speed of the crankshaft 21 (see FIG. 1) rotated by the unequal interval combustion engine 20.

REFERENCE SIGNS LIST 10, 210 unequal interval combustion engine misfire determination device
12 rotation speed acquisition unit
13 unequal interval combustion fluctuation canceled value acquisition unit
14 unequal interval combustion fluctuation manifested value calculation unit
15, 215 specific cylinder misfire determination unit
19 misfire announcing unit
20 unequal interval combustion engine
21 crankshaft
50 straddled vehicle

The invention claimed is:

1. An unequal interval combustion engine misfire determination device that determines a misfire in an unequal interval combustion engine including a plurality of cylinders in which combustion occurs at unequal intervals and a crankshaft, the determination being performed based on a crank angle signal indicating a rotation angle of the crankshaft, the unequal interval combustion engine misfire determination device comprising:

an unequal interval combustion fluctuation canceled value acquisition unit that acquires an unequal interval combustion fluctuation canceled value in which a fluctuation component attributable to an unequal interval combustion is canceled, for every 720 crank angle degrees based on the crank angle signal while the unequal interval combustion engine is in operation, the unequal interval combustion fluctuation canceled value being a rotation speed in a section of 720×m crank angle degrees including a predetermined determination angle position, where m is a natural number;

an unequal interval combustion fluctuation manifested value calculation unit that calculates an unequal interval combustion fluctuation manifested value in which the fluctuation component attributable to the unequal interval combustion is manifested based on the crank angle signal while the unequal interval combustion engine is in operation, the calculation being performed by removing, from a rotation speed at the determination angle position, the unequal interval combustion fluctuation canceled value acquired by the unequal interval combustion fluctuation canceled value acquisition unit and being a rotation speed in a section of 720×m crank angle degrees including the determination angle position; and a specific cylinder misfire determination unit that determines a misfire in a specific cylinder among the plurality of cylinders included in the unequal interval combustion engine, based on the unequal interval combustion fluctuation manifested value calculated by the unequal interval combustion fluctuation manifested value calculation unit while the unequal interval combustion engine is in operation, and a predetermined reference value pre-stored in the engine misfire determination device.

2. The unequal interval combustion engine misfire determination device according to claim 1, wherein the unequal interval combustion fluctuation canceled value acquisition unit acquires, for every 720 crank angle degrees, a rotation speed in a section of 720×m crank angle degrees centered at the determination angle position, as the unequal interval combustion fluctuation canceled value, the unequal interval combustion fluctuation manifested value calculation unit calculates the unequal interval combustion fluctuation manifested value in which the fluctuation component attributable to unequal interval combustion is manifested, by removing, from a rotation speed, at least at the determination angle position, a first value that is a value of the rotation speed in a section of 720×m crank angle degrees centered at the determination angle position, the first value serving as the unequal interval combustion fluctuation canceled value acquired by the unequal interval combustion fluctuation canceled value acquisition unit, and the specific cylinder misfire determination unit determines a misfire in a specific cylinder among the plurality of cylinders included in the unequal interval combustion engine, based on the unequal interval combustion fluctuation manifested value calculated by the unequal interval combustion fluctuation manifested value calculation unit.

3. The unequal interval combustion engine misfire determination device according to claim 2, wherein the specific cylinder misfire determination unit determines a misfire in a specific cylinder of the unequal interval combustion engine based on comparison of the unequal interval combustion fluctuation manifested value, calculated by the unequal interval combustion fluctuation manifested value calculation unit while the unequal interval combustion engine is in operation, against a predetermined reference value.

4. The unequal interval combustion engine misfire determination device according to claim 2, wherein the unequal interval combustion fluctuation canceled value acquisition unit further acquires, as a reference fluctuation canceled value, a value of a rotation speed in a section of 720×m crank angle degrees centered at a reference angle position different from the determination angle position, the reference angle position being such a position that a value obtained by removing a rotation speed in a section of 720×m crank angle degrees centered at the reference angle position from a rotation speed at the reference angle position is opposite in plus/minus sign, corresponding to a positive/negative magnitude, to the unequal interval combustion fluctuation manifested value obtained at the determination angle position in a case of a misfire occurring, the unequal interval combustion fluctuation manifested value calculation unit further calculates a reference fluctuation manifested value in which the fluctuation component attributable to unequal interval combustion is manifested, by removing the reference fluctuation canceled value from the rotation speed at the reference angle position, based on the crank angle signal, and the specific cylinder misfire determination unit determines a misfire in a specific cylinder of the unequal interval combustion engine based on a difference between the unequal interval combustion fluctuation manifested value and the reference fluctuation manifested value.

5. The unequal interval combustion engine misfire determination device according to claim 4, wherein the specific cylinder misfire determination unit determines a misfire in a specific cylinder of the unequal interval combustion engine based on comparison of a difference between the unequal interval combustion fluctuation manifested value and the reference fluctuation manifested value against a predetermined reference value.

6. A vehicle comprising:
the unequal interval combustion engine misfire determination device according to claim 1; and
an unequal interval combustion engine for which a misfire is determined by the unequal interval combustion engine misfire determination device.

7. A vehicle, comprising:
the unequal interval combustion engine misfire determination device according to claim 2; and
an unequal interval combustion engine for which a misfire is determined by the unequal interval combustion engine misfire determination device.

8. A vehicle, comprising:
the unequal interval combustion engine misfire determination device according to claim 3; and
an unequal interval combustion engine for which a misfire is determined by the unequal interval combustion engine misfire determination device.

9. A vehicle, comprising:
the unequal interval combustion engine misfire determination device according to claim 4; and
an unequal interval combustion engine for which a misfire is determined by the unequal interval combustion engine misfire determination device.

10. A vehicle, comprising:
the unequal interval combustion engine misfire determination device according to claim 5; and
an unequal interval combustion engine for which a misfire is determined by the unequal interval combustion engine misfire determination device.

* * * * *